(12) United States Patent
Azuma et al.

(10) Patent No.: US 7,878,721 B2
(45) Date of Patent: Feb. 1, 2011

(54) LIGHT AMOUNT ADJUSTER, LENS BARREL, AND IMAGE PICKUP DEVICE

(75) Inventors: Ryuhei Azuma, Kanagawa (JP); Atsuya Ishii, Kanagawa (JP); Kunioki Takahashi, Chiba (JP); Shinichirou Yamashita, Tokyo (JP); Kenichi Daikai, Chiba (JP)

(73) Assignee: Sony Corporation, Tokyo (JP)

( * ) Notice: Subject to any disclaimer, the term of this patent is extended or adjusted under 35 U.S.C. 154(b) by 219 days.

(21) Appl. No.: 12/285,846

(22) Filed: Oct. 15, 2008

(65) Prior Publication Data

US 2009/0116832 A1 May 7, 2009

(30) Foreign Application Priority Data

Nov. 1, 2007 (JP) .............................. 2007-285077

(51) Int. Cl.
*G03B 9/02* (2006.01)
(52) U.S. Cl. ..................................................... 396/510
(58) Field of Classification Search .......... 396/505–510
See application file for complete search history.

(56) References Cited

U.S. PATENT DOCUMENTS 2,887,027 A * 5/1959 Rentschler .................. 396/452
5,997,187 A 12/1999 Hamasaki
2005/0226611 A1* 10/2005 Kawaguchi ................. 396/505

FOREIGN PATENT DOCUMENTS

| EP | 1 591 828 A2 | 11/2005 |
|---|---|---|
| JP | 04-119434 | 4/1992 |
| JP | 06-55138 | 7/1994 |
| JP | 2000-352736 | 12/2000 |
| JP | 2002-162665 | 6/2002 |

(Continued)

OTHER PUBLICATIONS

English Translation of a Japanese Office Action issued Nov. 19, 2009 for corresponding Japanese Application No. 2007-285077.
Japanese Office Action issued Feb. 4, 2010 for corresponding Japanese Application No. 2007-285077.

(Continued)

*Primary Examiner*—W. B. Perkey
*Assistant Examiner*—Dennis Hancock
(74) *Attorney, Agent, or Firm*—Rader, Fishman & Grauer PLLC

(57) ABSTRACT

A light amount adjuster for adjusting a size of a diaphragm aperture on an optical axis of an optical system, includes: a pair of straight moving diaphragm blades so provided at a portion to which the diaphragm aperture is opposed as to slide along a plane orthogonal to the optical axis in a direction of getting close to or separated from the optical axis; a pair of swing diaphragm blades so provided at a portion to which the diaphragm aperture is opposed as to swing about a center axis in parallel to the optical axis in a direction of getting close to or separated from the optical axis; and a drive mechanism for adjusting the size of the diaphragm aperture by sliding the pair of straight moving diaphragm blades and by allowing the pair of swing diaphragm blades to swing.

11 Claims, 25 Drawing Sheets

FOREIGN PATENT DOCUMENTS

| | | |
|---|---|---|
| JP | 2005-156897 | 6/2005 |
| JP | 2005-309317 | 11/2005 |
| JP | 2006-053409 A | 2/2006 |
| JP | 2006-178366 A | 7/2006 |
| JP | 2007-192860 A | 8/2007 |

OTHER PUBLICATIONS

European Search Report dated Mar. 4, 2009 for corresponding European Application No. 08 25 3094.

Japanese Office Action issued Apr. 22, 2010 for corresponding Japanese Application No. 2007-285077.

* cited by examiner

LIGHT AMOUNT ADJUSTER, LENS BARREL, AND IMAGE PICKUP DEVICE

CROSS REFERENCES TO RELATED APPLICATIONS

The present invention contains subject matter related to Japanese Patent Application JP 2007-285077 filed in the Japanese Patent Office on Nov. 1, 2007, the entire contents of which being incorporated herein by reference.

BACKGROUND OF THE INVENTION

1. Field of the Invention

The present invention relates to a light amount adjuster, a lens barrel, and an image pickup device.

2. Description of the Related Art

There is used a light amount adjuster (diaphragm device) built into a lens barrel of an image pickup device such as a video camera and a digital still camera.

As light amount adjusters, there are two kinds of devices being in use. One is a device adopting an iris diaphragm which adjusts a size of a diaphragm aperture by swinging a plurality of diaphragm blades arranged around the diaphragm aperture in an interlocking matter. The other is a device in which two diaphragm blades are slid along a line orthogonal to an optical axis, sandwiching the diaphragm aperture (see JP-A No. 2000-352736).

The former light amount adjuster has a structure in which two or more diaphragm blades are arranged around the diaphragm aperture. Therefore, since there is a growing demand for a large space in a periphery of the diaphragm aperture, it is disadvantageous in making a device compact.

On the other hand, the latter light amount adjuster has a structure in which two diaphragm blades are slid along a straight line. Since there is not a growing demand for a large space on both sides of the diaphragm blades, it is advantageous in making the device compact.

SUMMARY OF THE INVENTION

In the latter light amount adjuster, in an open state, a shape of the diaphragm (a shape of the diaphragm aperture) formed by two diaphragm blades is substantially circular. However, as the diaphragm aperture comes to be made small, it becomes substantially rhombic. Therefore, as shown in FIG. 27B, when a ghost 6 of a shape of the aperture or defocusing of the shape of the aperture occur while filming, the shapes of the ghost 6 and defocusing become rhombic. Therefore, a visually unnatural image is photographed.

On the other hand, in the light amount adjuster where the iris diaphragm is used, regardless of the size of the diaphragm aperture, the shape of the diaphragm becomes substantially circular or regular polygonal. Therefore, as shown in FIG. 27A, the shape of the ghost 6 or defocusing becomes substantially circular or substantially regular polygonal. As a result, a visually natural image is photographed.

Also, in the latter light amount adjuster, because the shape of the diaphragm becomes rhombic, as compared with the case of the iris diaphragm, the effect of diffraction degradation caused by the light reflected at the edge portion (opening of the diaphragm) of the diaphragm blades given to the resolution of the photographed image is conspicuous.

The present invention is made in view of the above and, according to embodiments of the present invention, there are provided a light amount adjuster, a lens barrel, and an image pickup device which are advantageous in achieving a favorable diaphragm shape and making the devices compact.

According to an embodiment of the present invention, there is provided a light amount adjuster which adjusts a size of a diaphragm aperture on an optical axis of an optical system, the light amount adjuster includes: a pair of straight moving diaphragm blades so provided at a portion to which the diaphragm aperture is opposed as to slide along a plane orthogonal to the optical axis in a direction of getting close to or separated from the optical axis; a pair of swing diaphragm blades so provided at a portion to which the diaphragm aperture is opposed as to swing about a center axis in parallel to the optical axis in the direction of getting close to or separated from the optical axis; and a drive mechanism which adjusts the size of the diaphragm aperture by sliding the pair of straight moving diaphragm blades and by allowing the pair of swing diaphragm blades to swing.

Further, according to an embodiment of the present invention, there is provided a lens barrel having a light amount adjuster which adjusts the size of the diaphragm aperture on the optical axis of the optical system, in which the light amount adjuster includes: a pair of straight moving diaphragm blades so provided at a portion to which the diaphragm aperture is opposed as to slide along a plane orthogonal to the optical axis in a direction of getting close to or separated from the optical axis; a pair of swing diaphragm blades so provided at a portion to which the diaphragm aperture is opposed as to swing about a center axis in parallel to the optical axis in the direction of getting close to or separated from the optical axis; and a drive mechanism which adjusts the size of the diaphragm aperture by sliding the pair of straight moving diaphragm blades and by allowing the pair of swing diaphragm blades to swing.

Still further, according to an embodiment of the present invention, there is provided an image pickup device having a light amount adjuster which adjusts a size of a diaphragm aperture on an optical axis of an optical system, the light amount adjuster includes: a pair of straight moving diaphragm blades so provided at a portion to which the diaphragm aperture is opposed as to slide along a plane orthogonal to the optical axis in a direction of getting close to or separated from the optical axis; a pair of swing diaphragm blades so provided at a portion to which the diaphragm aperture is opposed as to swing about a center axis in parallel to the optical axis in the direction of getting close to or separated from the optical axis; and a drive mechanism which adjusts the size of the diaphragm aperture by sliding the pair of straight moving diaphragm blades and by allowing the pair of swing diaphragm blades to swing.

In the embodiments according to the present invention, there are provided the pair of straight moving diaphragm blades and the pair of swing diaphragm blades. When the straight moving diaphragm blades slide and the swing diaphragm blades swing, the size of the diaphragm aperture is adjusted. Therefore, regardless of the size of the diaphragm aperture, the shape of the formed diaphragm aperture can be substantially circular or substantially regular hexagonal. Thus, as compared to the light amount adjuster using an iris diaphragm, a space around the diaphragm aperture can be reduced.

BRIEF DESCRIPTION OF THE DRAWINGS

Embodiments of the present invention will be described in detail based on the following figures, wherein.

DESCRIPTION OF THE PREFERRED EMBODIMENTS

Figure 1:
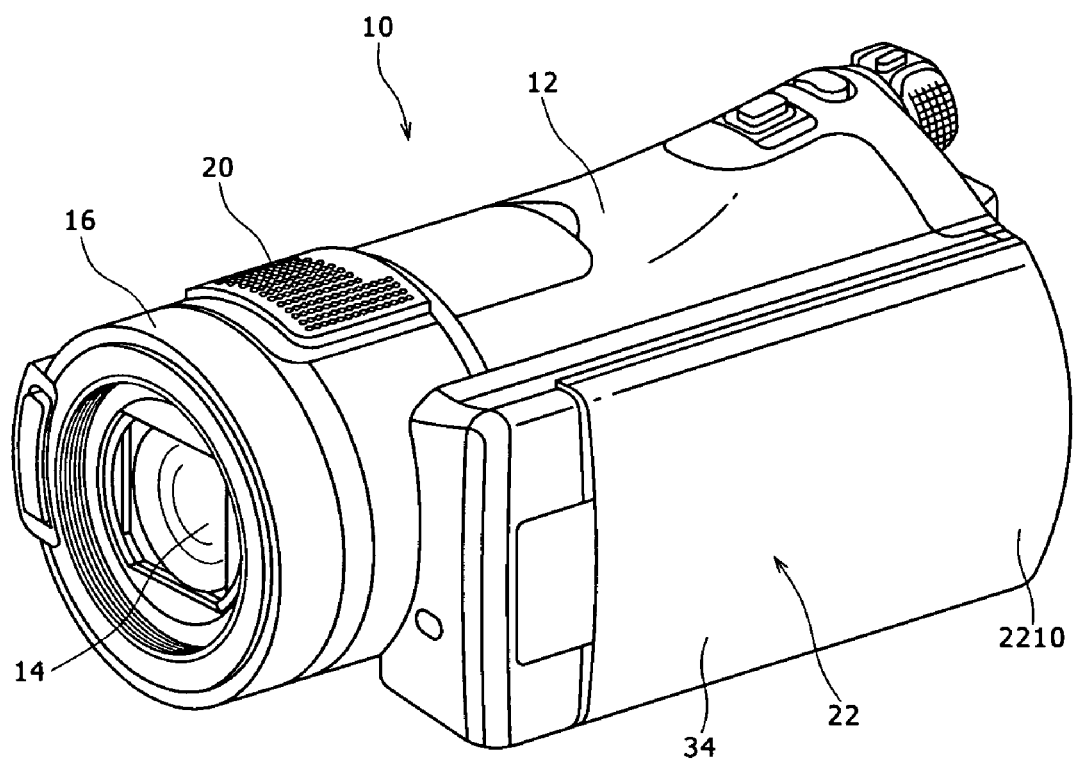
FIG. 1 is a perspective view of an image pickup device according to a present embodiment.
Figure 2:
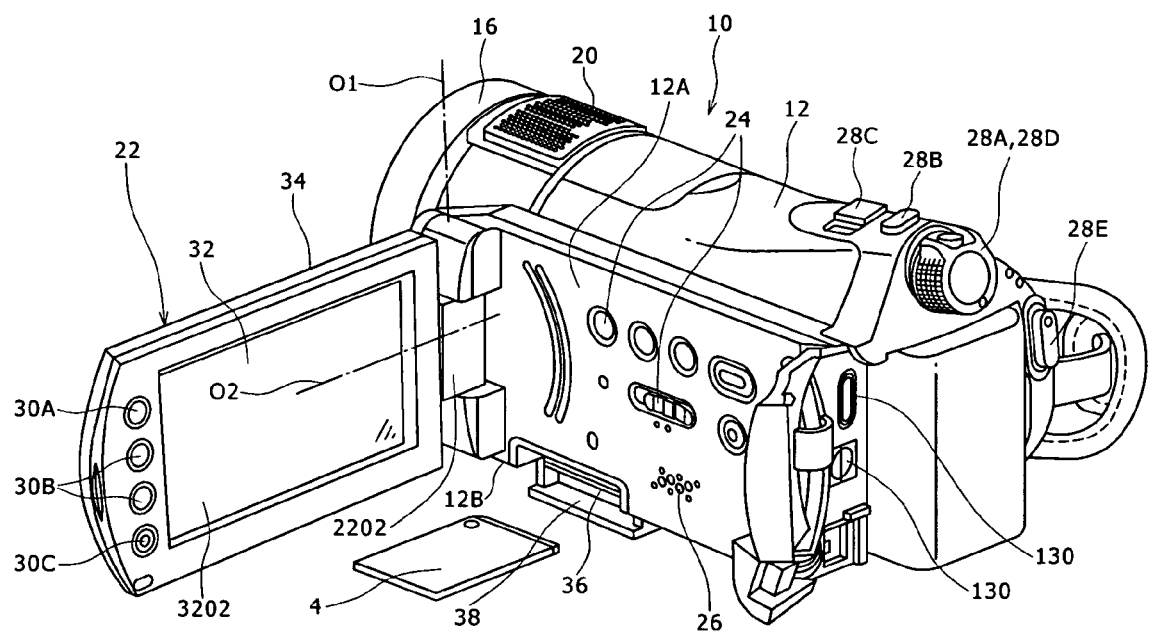
FIG. 2 is a perspective view showing a state where a display panel of the image pickup device is at an open position.
Figure 3:
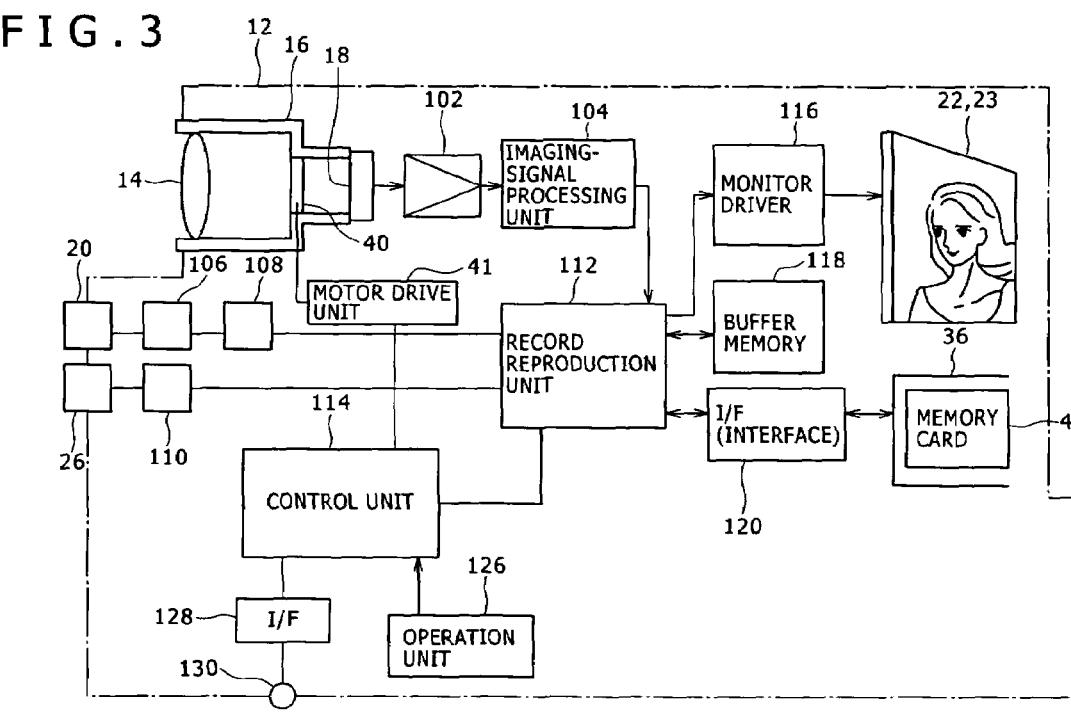
FIG. 3 is a block diagram showing the configuration of a control system of the image pickup device.

Now, with reference to the drawings, preferred embodiments according to the present invention will be explained. FIG. 1 is a perspective view of an image pickup device 10 according to the present embodiment. FIG. 2 is a perspective view of a state where a display panel 22 of the image pickup device 10 is located in an open position, and FIG. 3 is a block diagram showing the configuration of a control system of the image pickup device 10.

First, with reference to FIG. 3, the configuration of the control system of the image pickup device 10 will be described. In the present embodiment, the image pickup device 10 is a video camera. In its recording medium, data such as picked up moving pictures, still pictures, sound, etc. are recorded. Also, such data are reproduced from the recording medium. According to the present embodiment, a case where a memory card 4 which is a plate-like or stick-like recording medium is used as a recording medium will be explained. Needless to say, however, a magnetic recording tape, an optical disk, a hard disk drive, etc. may be used as a recording medium. That is, any proper recording medium may be used as required.

The image pickup device 10 includes a case 12 constituting an outer casing. There is provided in the case 12 a lens barrel 16 in which a photographing optical system 14 is incorporated. Provided at a rear end of the lens barrel 16 is an image pickup element 18 which picks up an object image introduced by the photographing optical system 14. Also, a light amount adjuster 40 according to the embodiment of the present invention is incorporated into the lens barrel 16.

Moreover, the image pickup device 10 includes a microphone 20, a display panel 22, a speaker 26, an imaging signal amplifier 102, an imaging-signal processing unit 104, an amplifier 106 for the microphone, an audio-signal processing unit 108, an output amplifier 110, a record reproduction unit 112, a control unit 114, a display panel driver 116, a buffer memory 118, a memory card interface 120, an operation unit 126, an external input-and-output interface 128, an external input-and-output terminal 130, a motor drive unit 41, etc.

The image pickup signal generated in the image pickup element 18 is amplified by the imaging signal amplifier 102, and is supplied to the imaging-signal processing unit 104.

The imaging-signal processing unit 104 generates video data and still picture data by performing predetermined signal processing on an image pickup signal. The generated data are supplied to the record reproduction unit 112.

An audio signal picked up by the microphone 20 is amplified by the amplifier 106 for the microphone, predetermined signal processing is given by the audio signal processing unit 108, and it is supplied to the record reproduction unit 112 as audio data.

Under the control of the control unit 114 and through the memory card interface 120, the record reproduction unit 112 records, on the memory card 4, the video data and still picture data supplied from the imaging-signal processing unit 104 or the audio data supplied from the audio-signal processing unit 108.

The record reproduction unit 112 records data on the memory card 4 in a following manner. For example, the record reproduction unit 112 once stores data to be recorded on the memory card 4 in the buffer memory 118. Then, the record reproduction unit 112 writes the data read from the buffer memory 118 to the memory card 4.

Moreover, the record reproduction unit 112 supplies the video data and still picture data to be supplied from the record reproduction unit 112 to the display panel 22 through the display panel driver 116 to display a picture.

Further, while the record reproduction unit 112 supplies the video data and still picture data supplied from the memory card 4 through the memory card interface 120 to the display panel 22 through the display panel driver 116, it also supplies an audio signal supplied from the memory card 4 through the memory card interface 120 to the speaker 26 through the output amplifier 110.

The external input-and-output interface 128 converts audio data and image data reproduced in the record reproduction unit 112 to a predetermined signal form and outputs them, through the external input-and-output terminal 130, to external devices such as a TV set, an HDD recorder, and a personal computer.

As shown in FIG. 2, the operation unit 126 includes: two or more operation switches 24, a power switch 28A, a switch 28B for still picture photography, a zoom operation switch 28C, a mode change switch 28D, and a switch 28E for moving picture photography. These switches 24 and 28A to 28E are operation switches for performing various functions related to photography.

The control unit 114 performs ON/OFF operation of the power source of the image pickup device 10 based on an operation of the power switch 28A.

By giving instructions to the imaging-signal processing unit 104 and record reproduction unit 112 based on operation of the switch 28B for still picture photography, the control unit 114 stores the still picture data on the memory card 4 by supplying still picture data, supplied from the imaging-signal processing unit 104, through the record reproduction unit 112 to the memory card interface 120. In other words, the switch 28B for still picture photography functions as what is called a shutter button.

By giving instructions to a zoom actuator (not shown) based on an operation of the zoom operation switch 28C, the control unit 114 changes a zooming rate of the photographing optical system 14 by moving the movable lens of the photographing optical system 14.

By giving instructions to the imaging-signal processing unit 104 based on an operation of the mode change switch 28D, the control unit 114 switches a moving picture photography mode in which video data are generate by the imaging-signal processing unit 104 and a still picture photography mode in which still picture data are generate by the imaging-signal processing unit 104.

In addition, in the moving picture photography mode, the video data generated in the imaging-signal processing unit 104 are recorded on the memory card 4 through the record reproduction unit 112. On the other hand, in the still picture photography mode, the still picture data generated in the imaging-signal processing unit 104 is recorded on the memory card 4 through the record reproduction unit 112.

Based on an operation of the switch 28E for moving picture photography, the control unit 114 starts the recording of the video data and stops the recording. That is, by giving instructions to the imaging-signal processing unit 104 and the record reproduction unit 112 based on the operation of the switch 28E for moving picture photography, the control unit 114 supplies video data supplied from the imaging-signal processing unit 104 to the memory card interface 120 through the record reproduction unit 112, which starts recording the video data on the memory card 4 or stops such an operation. In other words, the switch 28E for moving picture photography functions as what is called an operation component for start/stop of the photography.

Moreover, a panel-side switch 30A for moving picture photography, a panel-side zoom operation switch 30B, and a menu switch 30C are connected to the control unit 114. The panel-side switch 30A for the moving picture photography has the same function as that of the switch 28E for moving picture photography, and the panel-side zoom operation switch 30B has the same function as that of the zoom operation switch 28C. Also, the menu switch 30C is a switch manipulated to directly return an item of a menu displayed on the display panel 22 to the uppermost item.

The motor drive unit 41 performs drive control of a motor 54 (FIG. 4) of the light amount adjuster 40 to be described later based on control of the control unit 114.

Now, the configuration of the image pickup device 10 will be described. As shown in FIGS. 1 and 2, the case 12 has a length in the front and back direction and a height in the up-and-down direction longer than a width in the right and left direction. Throughout this specification, the right and the left corresponds to that when the image pickup device 10 is viewed from the back side. The object side in a direction of an optical axis of an optical system is referred to as the front side, whereas the image pickup element side is referred to as the back side.

The lens barrel 16 extends in the front and back direction at the front on the upper portion of the case 12 so that its front part may face the front of the case 12. Therefore, the object image is introduced to the inside of the case 12 from the front part of the case 12.

The image pickup element 18 (FIG. 3) is provided at the back end of the lens barrel 16.

The microphone 20 is provided on the upper surface of the lens barrel 16.

The display panel 22 is provided on the left-hand side part of the case 12 such that it can be opened and closed.

The display panel 22 includes a display device 32 and a panel case 34, and presents a rectangular plate-like shape.

As shown in FIG. 2, the display device 32 displays the object image etc. taken by the image pickup element 18. The display device 32 has a rectangular display surface 3202 on which a picture is displayed, and the display surface 3202 constitutes the inner surface of the display panel 22.

According to one embodiment of the present embodiment, the display device 32 includes a liquid crystal display device. However, any type of the display device 32 can be used. For instance, it may be an organic EL display device.

The display panel 22 is constructed such that its portion closer to one of short sides is connected to a portion closer to the front part of the left-hand side part of the case 12 through a hinge 2202. Further, it is connected such that it is capable of swinging about a first axis O1 extending in an up-and-down direction of the case 12 and, also, about the second axis O2 orthogonal to the first axis O1.

According to the present embodiment, the display panel 22 is constructed such that it swings between a receiving position where the display surface 3202 (inner face of the panel 22) of the display device 32 is overlapped on a left side surface 12A of the case 12 about the first axis O1 as shown in FIG. 2 and an open position where it is opened by 90 degrees from the receiving position and the display surface 3202 of the display device 32 faces backward as shown in FIG. 2. In addition, at the receiving position where the display surface 3202 (the inner surface of the panel 22) is overlapped on the left side face 12A of the case 12, an external surface 2210 (FIG. 1) of the display panel 22 is directed outward.

Moreover, the display panel 22 is constituted such that it may swing about the second axis O2 at the open position within a range of 270 degrees between a position where the display surface 3202 of the display device 32 faces forward and a position where it faces downward.

As shown in FIG. 2, two or more operation switches 24 for performing various operations, the speaker 26, etc. are provided in the left side face 12A of the case 12.

At an upper portion of the case 12 close to the rear end, there are provided the power switch 28A, the switch 28B for still picture photography, the zoom operation switch 28C, the mode change switch 28D, etc. On the rear surface of the case 12, the switch 28E for moving picture photography is provided.

Moreover, on the display panel 22, there are provided the panel-side switch 30A for moving picture photography, the panel-side zoom operation switch 30B, the menu switch 30C, etc.

As shown in FIG. 2, at the lower portion of the left side face 12A of the case 12, there are provided a slot 36 into and from which the memory card 4 is inserted and removed and a lid member 38 for revealing or covering an opening 3602 of the slot 36.

When the memory card 4 is inserted into the slot 36, a contact terminal of the memory card 4 is electrically connected to a connector (not shown) of the inside of the slot 36. Accordingly, signals are sent to and received from the memory card interface 120 through the connector.

Now, the light amount adjuster 40, which is a principal part according to the embodiment of the present invention, will be described.

Figure 4:
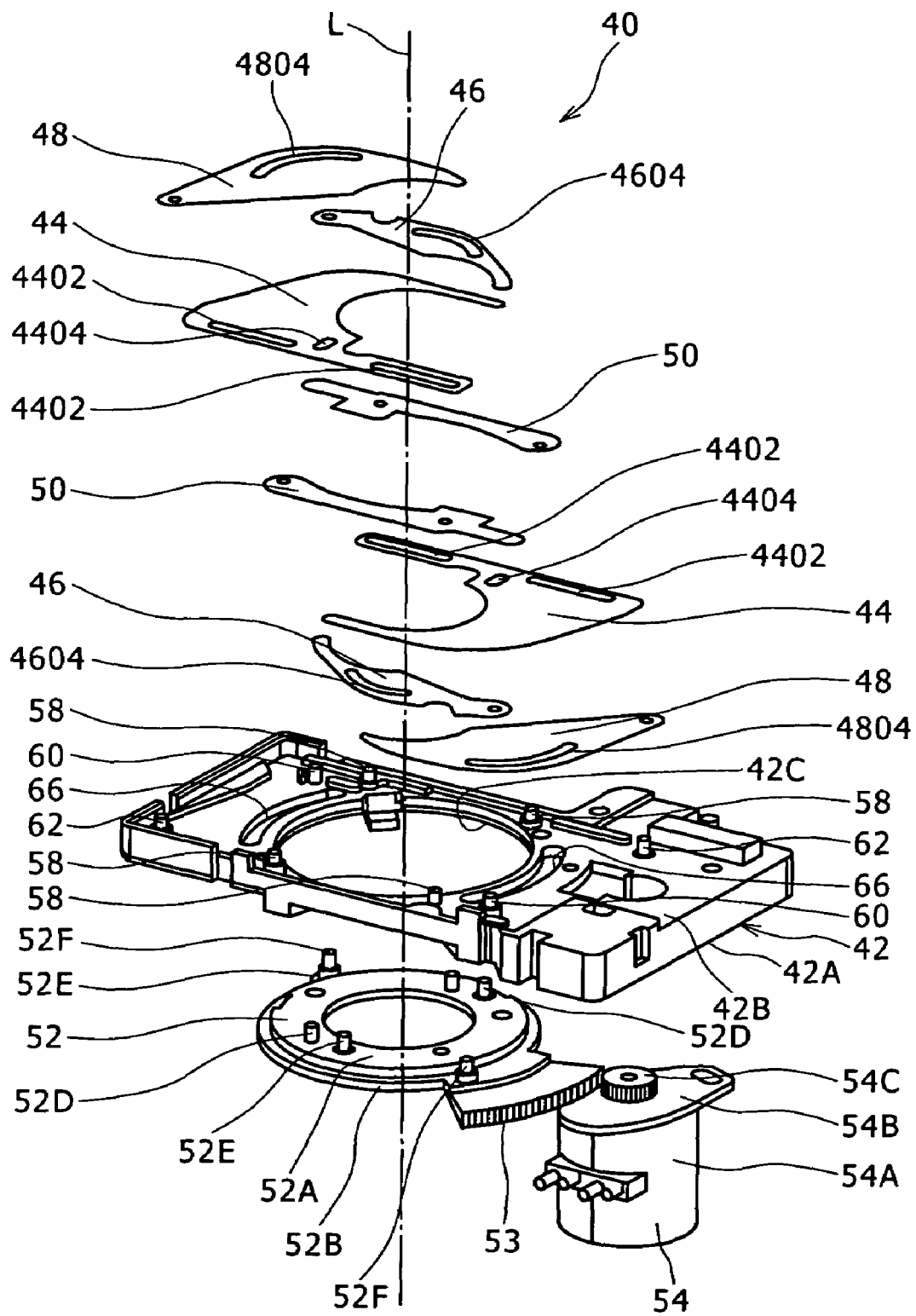
FIG. 4 is an exploded perspective view showing the configuration of a light amount adjuster.
Figure 5:
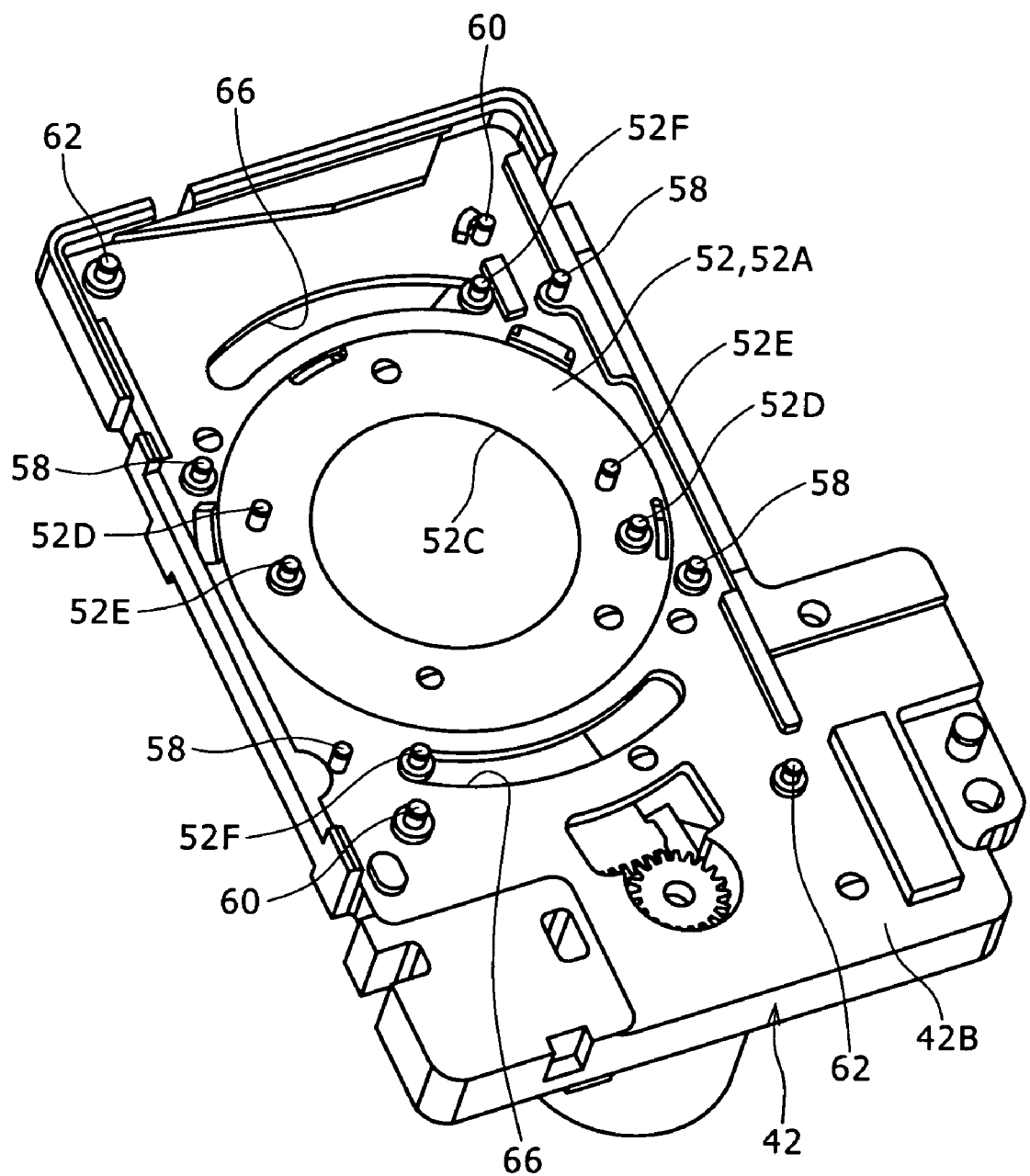
FIG. 5 is a perspective view, as viewed from the back side, of the light amount adjuster without straight moving diaphragm blades and first and second swing diaphragm blades.
Figure 6:
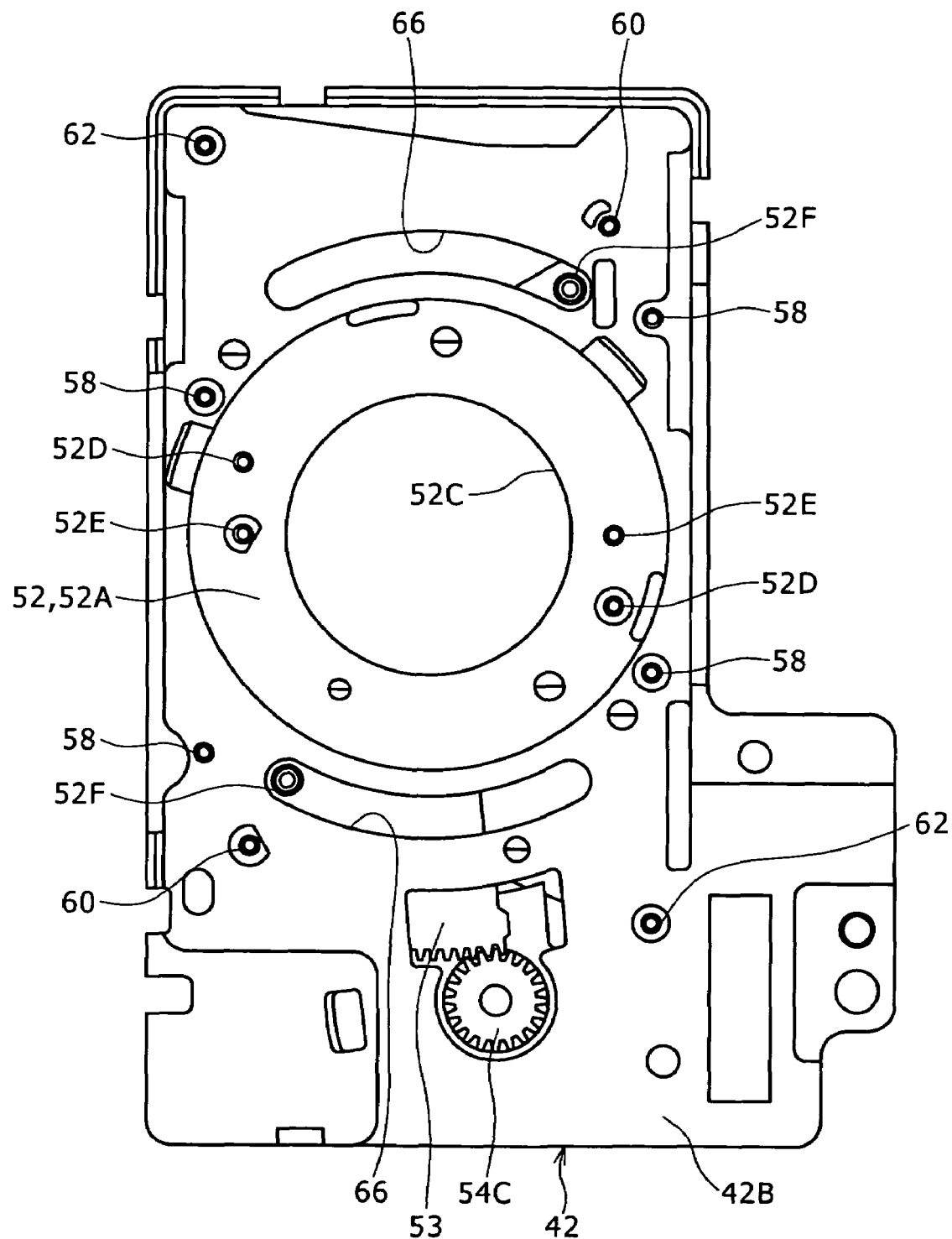
FIG. 6 is a plan view, as viewed from the back side, of the light amount adjuster without the straight moving diaphragm blades and the first and second swing diaphragm blades.
Figure 7:
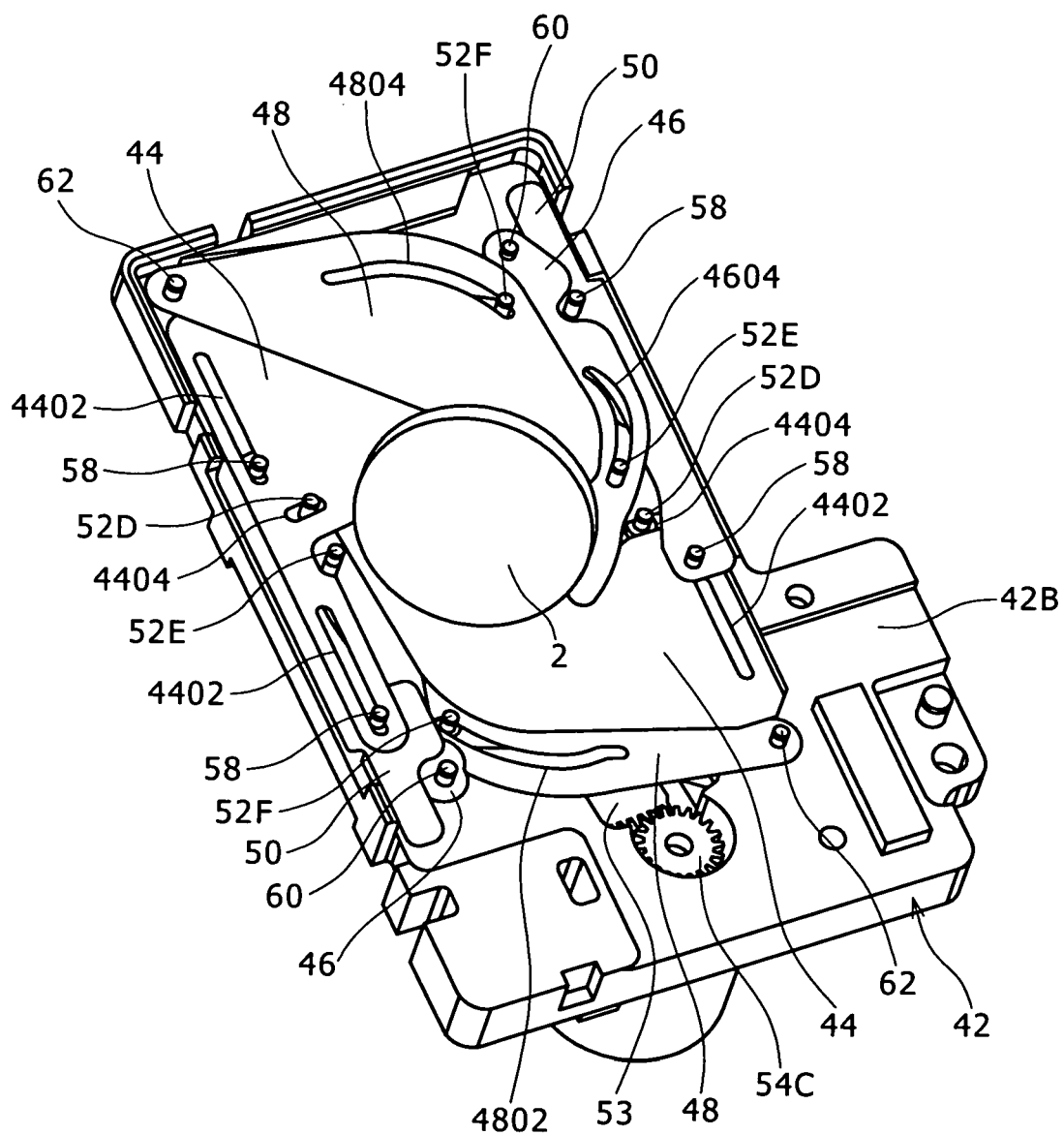
FIG. 7 is a perspective view of the light amount adjuster viewed from the back side.
Figure 24:
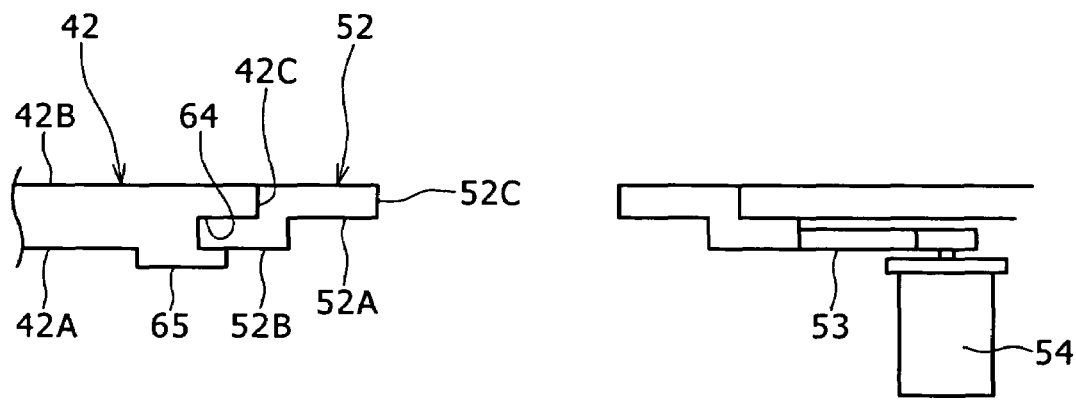
FIG. 24 is a sectional view of a base member and an annular plate.

FIG. 4 is an exploded perspective view showing the configuration of the light amount adjuster 40. FIG. 5 is a perspective view, as viewed from the back side, of the light amount adjuster 40 without straight moving diaphragm blades 44 and first and second swing diaphragm blades 46 and 48. FIG. 6 is a plan view, as viewed from the back side, of the light amount adjuster 40 without the straight moving diaphragm blades 44 and the first and second swing diaphragm blades 46 and 48. FIG. 7 is a perspective view of the light amount adjuster 40 as viewed from the back side. FIG. 24 is a sectional view of a base member 42 and an annular plate 52.

As shown in FIGS. 4 to 7, by adjusting the size of a diaphragm aperture 2, which limits a light beam led to the image pickup element 18 through the photographing optical system 14, the light amount adjuster 40 adjusts the light amount led to the image pickup element 18.

The light amount adjuster 40 is disposed in the front of the image pickup element 18. According to the present embodiment, the light amount adjuster 40 includes a base member 42, the pair of straight moving diaphragm blades 44, the pair of first swing diaphragm blades 46, the pair of second swing diaphragm blades 48, two spacers 50, the annular plate 52, the motor 54, a lid member 56 (see FIG. 9), etc.

The base member 42 presents a rectangular plate-like shape and is made of a synthetic resin which prevents light from passing through. The base member 42 is built in the lens barrel 16 with its long-side direction being directed to the upper and lower sides of the case 12.

As shown in FIGS. 4 and 24, the base member 42 has a front face 42A facing forward and a rear face 42B facing backward. In the base member 42, there is formed a circular hole 42C on an optical axis L of the photographing optical system 14.

As shown in FIGS. 4 and 5, on the rear face 42B of the base member 42, there are provided two guide pins 58, for each straight moving diaphragm blade 44, which guide two straight moving diaphragm blades 44 to be slidable. Those guide pins 58 for straight moving diaphragm blades are provided in the periphery of the hole 42C.

Moreover, on the rear face 42B, there are provided pivots 60 for first swing diaphragm blades which respectively support the pair of first swing diaphragm blades 46 such that they are able to swing. At the same time, there are provided pivots 62 for second swing diaphragm blades which respectively support the pair of second swing diaphragm blades 48 such that they are able to swing.

As shown in FIG. 24, around the hole 42C on the front face 42A of the base member 42, a ring-like concave portion 64 is formed.

Figure 10:
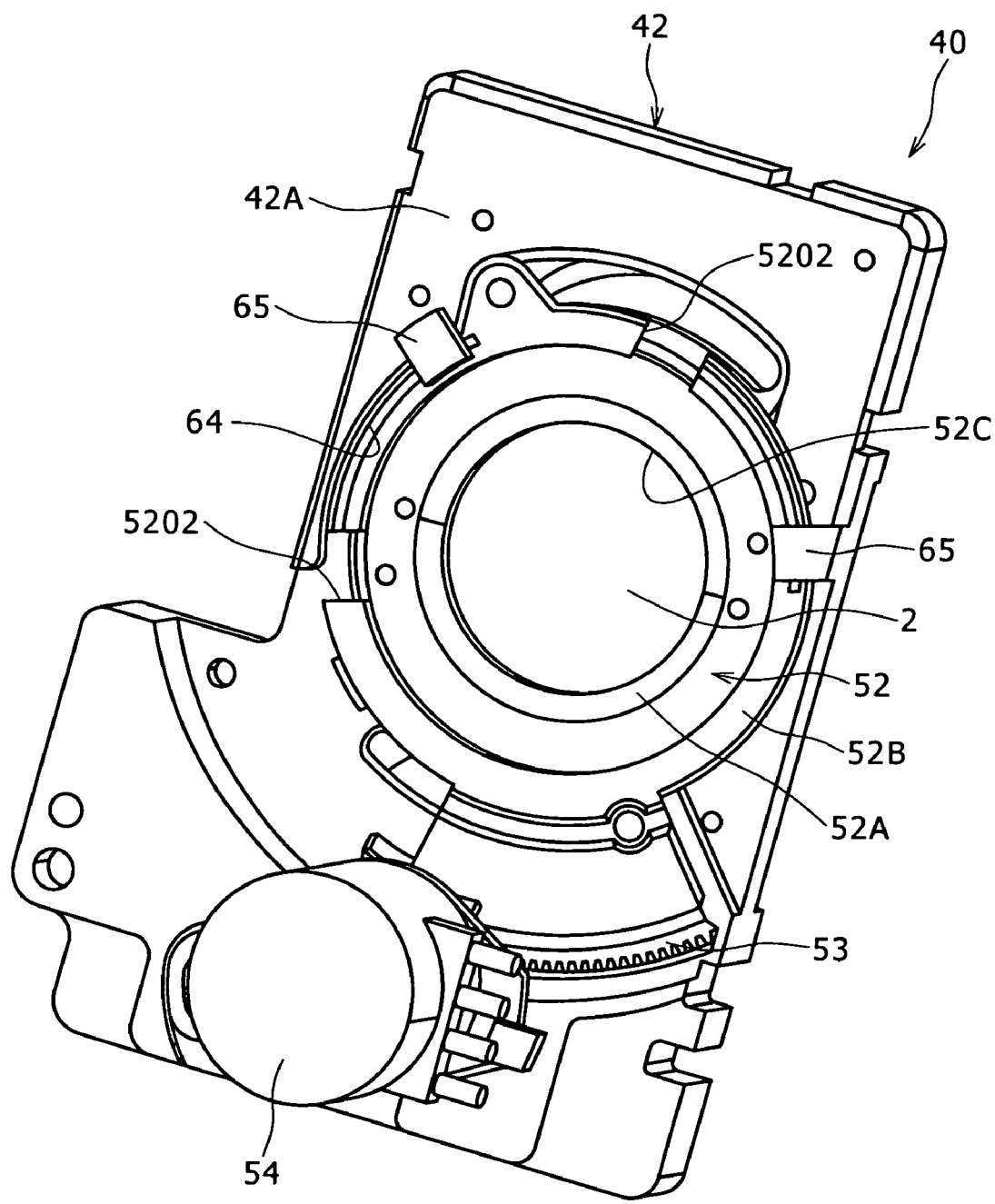
FIG. 10 is a perspective view of the light amount adjuster showing a state where the diaphragm aperture is open as viewed from the front side.

Moreover, as shown in FIGS. 10 and 24, on the front face 42A outside the concave portion 64, there are provided two engagement walls 65 with a space therebetween in a circumferential direction of the concave portion 64. The engagement walls 65 extend above the concave portion 64.

As shown in FIG. 5, in the base member 42, there are provided two arc-like clearance grooves 66 through which drive pins 52F for the second swing diaphragm blades provided in the annular plate 52 to be described later are inserted in an extending manner along the circumferential direction of the optical axis L. These clearance grooves 66 are formed coaxially with a hole 46C. The clearance grooves 66 are provided on the both sides of the hole 46C in a direction along which the straight moving diaphragm blades 44 reciprocate.

The annular plate 52 is made of a synthetic resin which prevents light from passing through. As shown in FIGS. 4 and 24, the annular plate 52 includes: a first annular plate part 52A; and a second annular plate part 52B formed along an outer circumference of the first annular plate 52A and is displaced to one side of the thickness direction (front direction) of the first annular plate part 52A. A hole 52C is formed in the center of the first annular plate part 52A. The first and second annular plate parts 52A and 52B, and the hole 52C are formed on the same axis. On a surface where the first annular plate part 52A faces the other end of the thickness direction (the surface facing backward), as shown in FIGS. 4 and 5, there are provided in a projecting manner, two drive pins 52D for straight moving diaphragm blades with an interval of 180 degrees about a central axis of the annular plate 52. At the same time, two drive pins 52E for the first swing diaphragm blades are provided in a projecting manner at the interval of 180 degrees about the central axis of the annular plate 52.

On the surface (the surface facing backward) where the second annular plate part 52B faces the other side of the thickness direction, there are provided, in a projecting manner, two drive pins 52F for second swing diaphragm blades at the interval of 180 degrees about the central axis of the annular plate 52.

At a portion of the outer circumference of the second annular plate part 52B, there is provided a gear part 53 which projects outward in a radial direction. The gear part 53 is formed in the shape of a fan with the center axis of the annular plate 52 as its center.

Further, in FIG. 10, the reference numeral 5202 denotes a notched portion which is provided in the second annular plate part 52B through which the engagement wall 65 is inserted when mounting the annular plate 52 to the base member 42.

As shown in FIG. 24, the annular plate 52 is mounted to the base member 42 in a following manner. First, while inserting the engaging wall 65 of the base member 42 through the notched portion 5202 of the second annular plate part 52B, an outer circumferential face of the first annular plate part 52A is slidably inserted into the inner circumferential surface of the hole 42C of the base member 42. The face to which the second annular plate part 52B opposes in one side (backward) of the thickness direction is allowed to engage with a concave portion 64 of the base member 42. At the same time, the face to which the second annular plate part 52B opposes in the other side (forward) of the thickness direction is allowed to engage with an engagement wall 65. Thus, the annular plate 52 is rotatably supported on the base member 42.

Moreover, according to the present embodiment, as shown in FIG. 24, the annular plate 52 includes: the ring-like first annular plate part 52A; and the second annular plate part 52B which is formed by being displaced to one side (front side) in the thickness direction of the first annular plate part 52A along the outer circumference of the first annular plate part 52A.

As a result of this, in the front and back direction, the second annular plate part 52B is displaced to the back of the first annular plate part 52A. Therefore, a concave space is formed in the front of the second annular plate part 52B.

Accordingly, when a movable lens which moves in a direction of an optical axis L is provided in the front side of the light amount adjuster 40, the stroke of the movable lens can be secured by receiving the portion of the movable lens facing backward in the concave space. Thus, the size of the lens barrel 16 in the optical axis direction can be reduced, which is advantageous in reducing the size of the image pickup device 10.

As shown in FIG. 4, the motor 54 includes: a case 54A; an attachment piece 54B; and a drive gear 54C. The motor 54 is rotated in either a normal direction or a reverse direction based on a drive current supplied from the motor drive unit 41 (FIG. 3).

One end of the case 54A is attached to the front face 42A of the base member 42 through the attachment piece 54B.

The drive gear 54C is fixed to a drive shaft projecting from one end of the case 54A, and is meshed with a gear part 53 of the annular plate 52.

When the motor 54 rotates in a normal/reverse direction, the annular plate 52 is allowed to swing about a central axis of the annular plate 52 through the drive gear 54C and the gear part 53.

Figure 20:
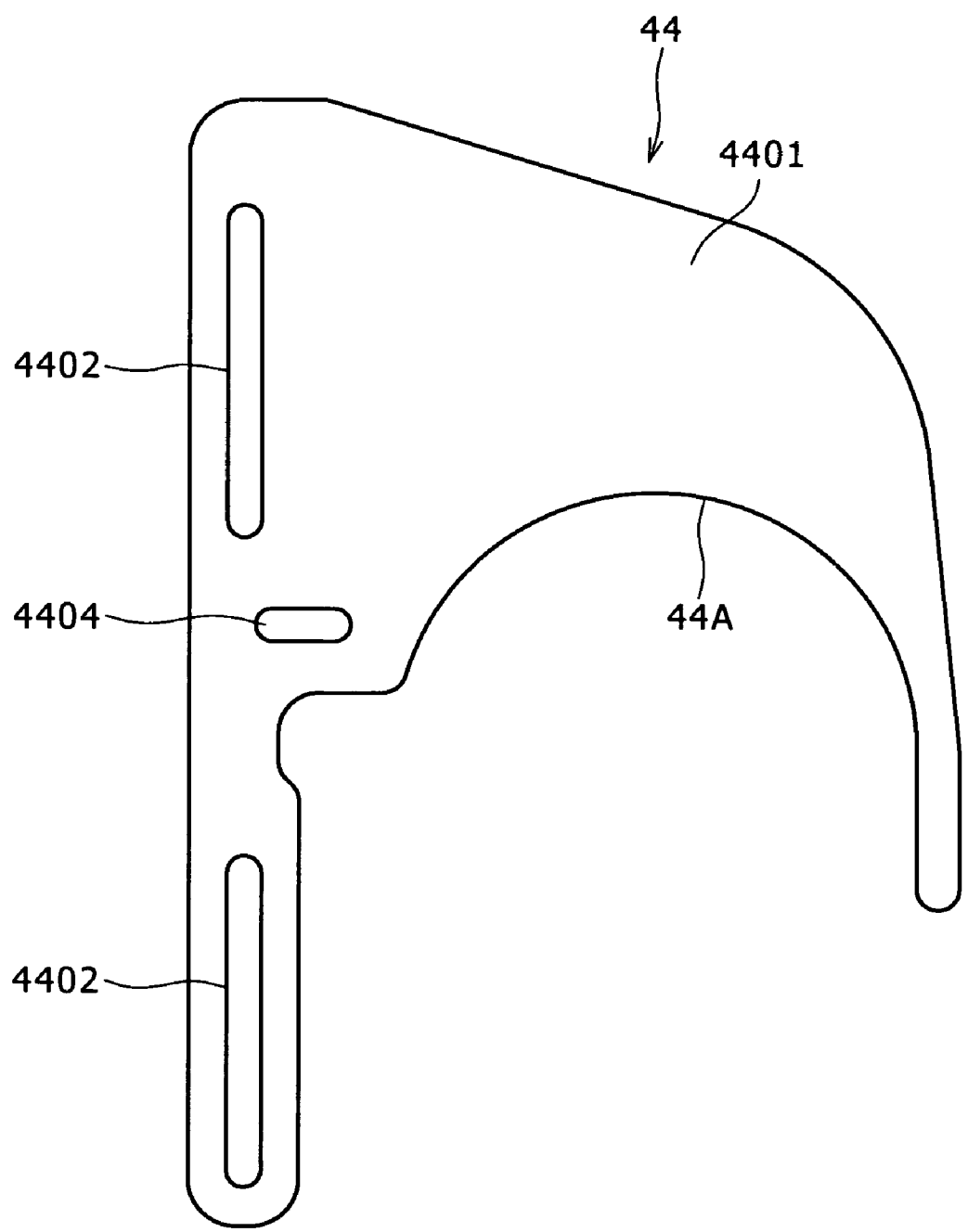
FIG. 20 is a plan view of a straight moving diaphragm blade.

FIG. 20 is a plan view of the straight moving diaphragm blade 44.

The straight moving diaphragm blade 44 is made of a synthetic resin which prevents light from passing through and presents a thin plate-like shape. It includes a straight-line part and a curved part which extends from the straight-line part.

Two guide grooves 4402 and an elongate hole 4404 are formed in the straight-line part. On the curved portion, there is provided an aperture-forming edge 44A.

The two guide grooves 4402 extend on the same line along the straight-line part of a plate portion 4401.

The elongate hole 4404 extends between the two guide grooves 4402 in a direction orthogonal to the straight line.

The aperture-forming edge 44A forms the diaphragm aperture 2 of the light amount adjuster 40, and extends along the curved portion of the plate part 4401 in a semi-arc concave shape.

Figure 21:
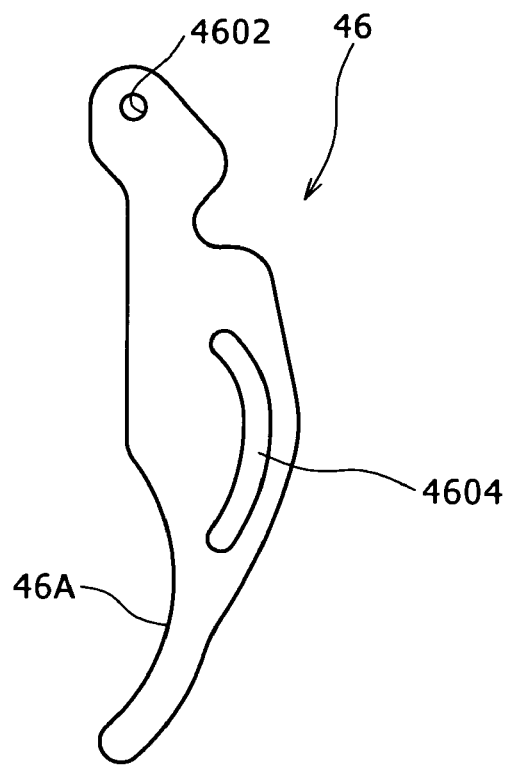
FIG. 21 is a plan view of a first swing diaphragm blade.

FIG. 21 is a plan view of the first swing diaphragm blade 46.

The first swing diaphragm blade 46 is made of a synthetic resin which prevents light from passing through and presents a thin plate-like elongate shape.

The first swing diaphragm blade 46 is provided with a hole 4602, a cam groove 4604, and an aperture-forming edge 46A.

The hole 4602 is formed at the end of the longitudinal direction of the first swing diaphragm blade 46.

The cam groove 4604 extends in a middle portion along a longitudinal direction of the first swing diaphragm blade 46.

The aperture-forming edge 46A forms the diaphragm aperture 2 of the light amount adjuster 40, and extends along one side of the width direction close to the other end of the longitudinal direction of the first swing diaphragm blade 46 in a concave arc-like shape.

Figure 22:
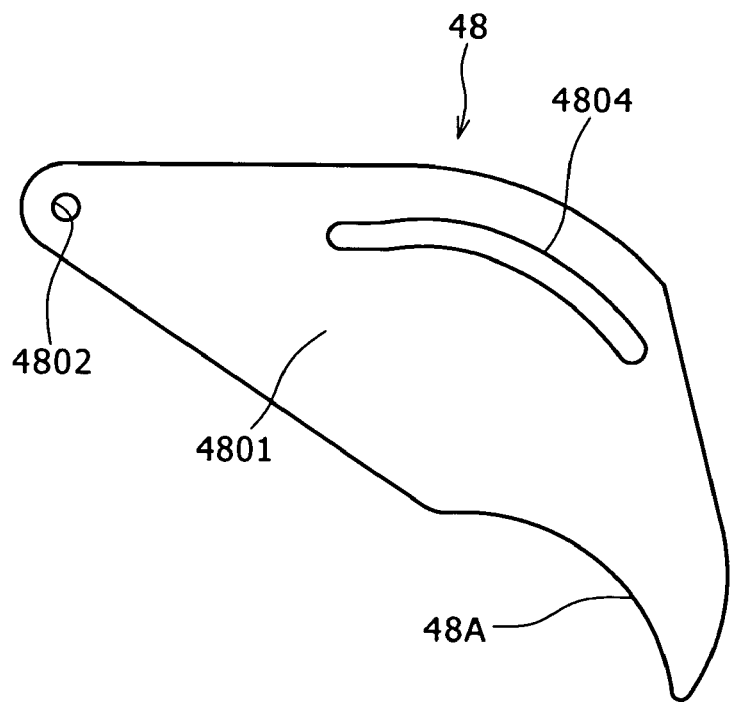
FIG. 22 is a plan view of a second swing diaphragm blade.

FIG. 22 is a plan view of the second swing diaphragm blade 48.

The second swing diaphragm blade 48 is made of a synthetic resin which prevents light from passing through, presents a thin-plate like shape, and its width gradually decreases as coming close to both ends of the longitudinal direction.

The second swing diaphragm blade 48 has a hole 4802, a cam groove 4804, and an aperture-forming edge 48A.

The hole 4802 is formed at one end of longitudinal direction of a plate part 4801.

The cam groove 4804 extends in a middle portion in the longitudinal direction of the plate part 4801.

The aperture-forming edge 48A for forming the aperture forms the diaphragm aperture 2 of the light amount adjuster 40, and extends along one side of the width direction close to the other end of the longitudinal direction of the second swing diaphragm blade 48 in a concave arc-like shape.

Figure 23:
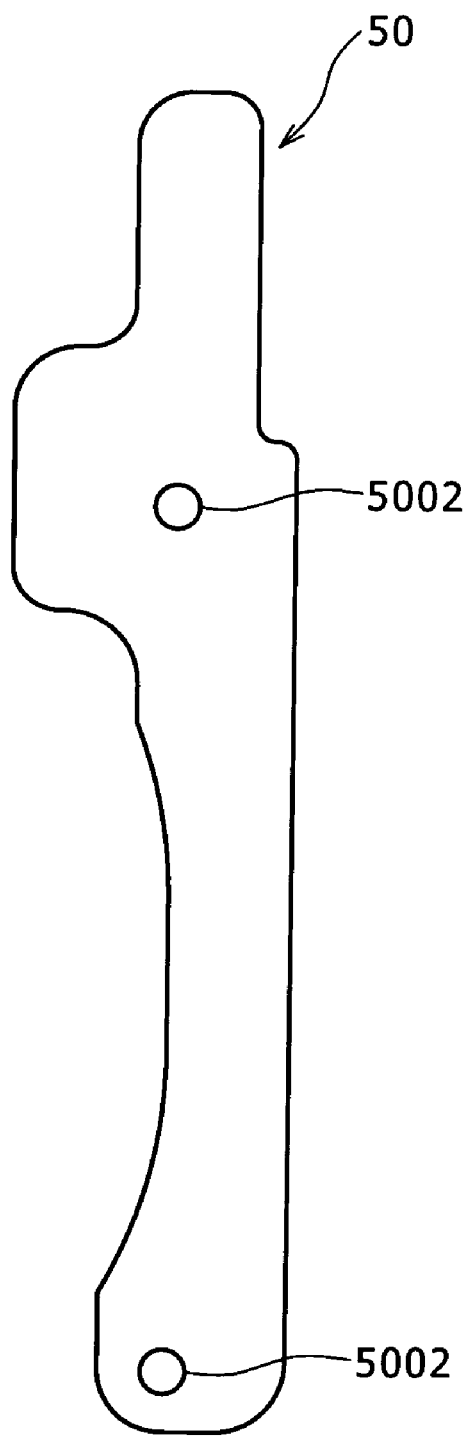
FIG. 23 is a plan view of a spacer.

FIG. 23 is a plan view of a spacer 50.

The spacer 50 is made of a synthetic resin which prevents light from passing through, and presents a thin plate-like elongate shape.

In the spacer 50, there are formed two mounting holes 5002 with a certain interval in the longitudinal direction.

Figure 9:
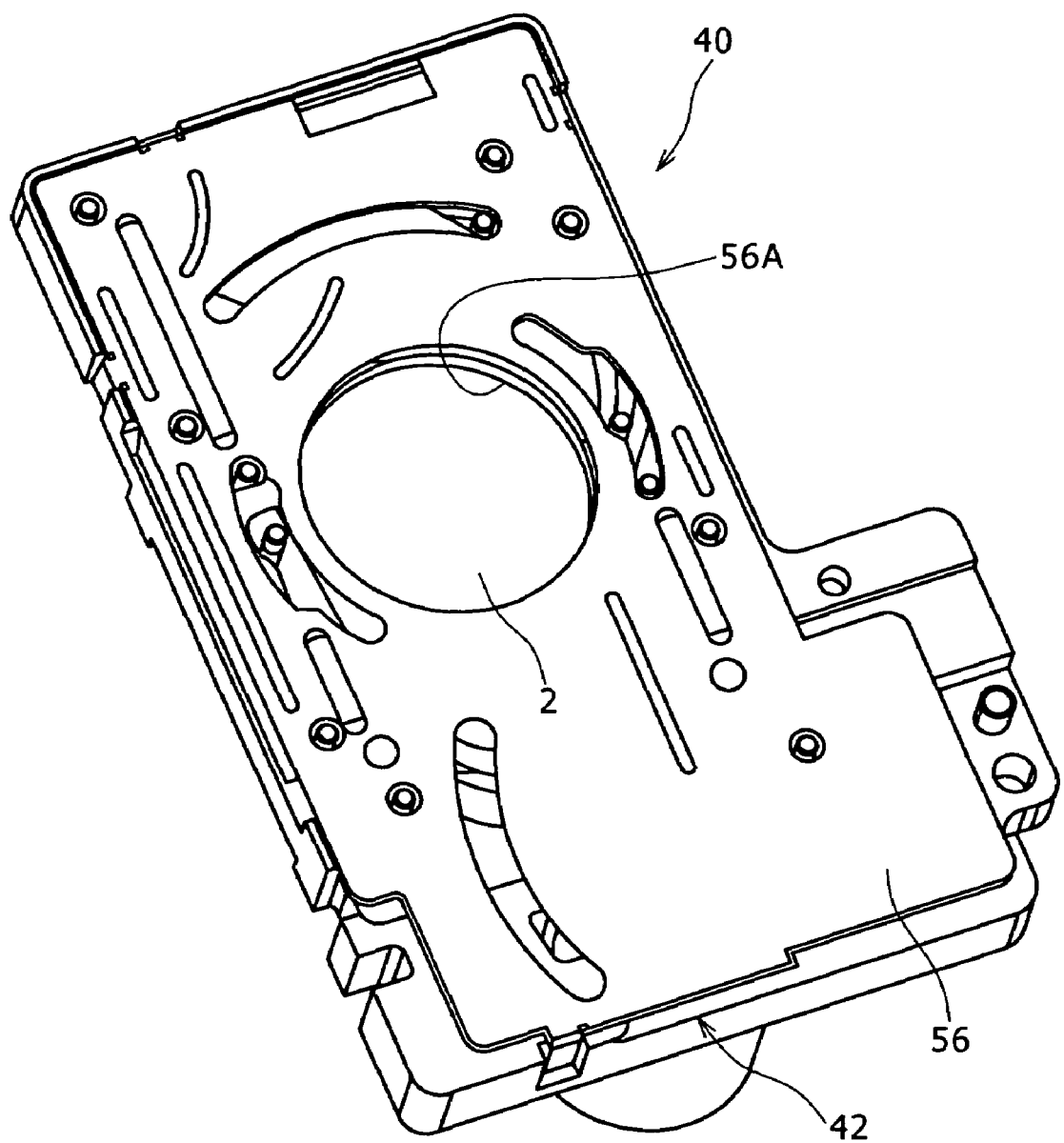
FIG. 9 is a perspective view of the light amount adjuster showing a state where the diaphragm aperture is open viewed from the back side.

The lid member 56 is made of a metal which prevents light from passing through. As shown in FIG. 9, the lid member 56 is composed of a thin plate large enough to cover the front face 42A of the base member 42. In the lid member 56, there is provided a hole 56A which allows the diaphragm aperture 2 to face outward while being mounted to the base member 42. A diameter of the hole 56A is equivalent to a diameter of the hole 42C of the base member 42.

The pair of straight moving diaphragm blades 44, the pair of first swing diaphragm blades 46, the pair of second swing diaphragm blades 48, and two spacers 50 are incorporated into respective portions of the base member 42 around the hole 46C.

To describe in detail, one of the pair of straight moving diaphragm blades 44, one of the pair of first swing diaphragm blades 46, one of the pair of second swing diaphragm blades 48, and one of the two spacers 50 are mounted as follows.

First, as shown in FIG. 4, while allowing one of the two second swing diaphragm blades 48 to oppose the rear face 42B of the base member 42, one pivot 62 for the second swing diaphragm blades is inserted into the hole 4802 of the second swing diaphragm blades 48. At the same time, one drive pin 52F for the second swing diaphragm blades is inserted into the cam groove 4804 of one of the second swing diaphragm blades 48.

Subsequently, one pivot 60 for the first swing diaphragm blades is inserted into the hole 4602 of one of the first swing diaphragm blades 46 such that one of the pair of first swing diaphragm blades 46 is overlapped on one of the second swing diaphragm blades 48. At the same time, one of the drive pins 52E for the first swing diaphragm blades is inserted into the cam groove 4604 of one of the first swing diaphragm blades 46.

Subsequently, one of the guide pins 58 for the straight moving diaphragm blades is inserted into two guide grooves 4402 of one of the straight moving diaphragm blades 44 such that one of the pair of straight moving diaphragm blades 44 is overlapped on one of the first and second swing diaphragm blades 46 and 48. At the same time, one of the drive pins 52D for the straight moving diaphragm blades is inserted into a long hole 4404 of one of the straight moving diaphragm blades 44.

Subsequently, one of the two guide pins 58 for the straight moving diaphragm blades is inserted into two mounting holes 5002 of one of the spacers 50 such that one of the two spacers 50 may be overlapped on one of the straight moving diaphragm blades 44.

The other one of the pair of the straight moving diaphragm blades 44, the other one of the pair of first swing diaphragm blades 46, the other one of the pair of two swing diaphragm blades 48, and the other one of the two spacers 50 are mounted in the following manner.

First, the other two guide pins 58 for straight moving diaphragm blades are inserted into the two mounting holes 5002 of the other spacers 50, respectively, so that the other one of the two spacers 50 may be overlapped on one of the first swing diaphragm blades 46.

Subsequently, the guide pin 58 of the other one of the straight moving diaphragm blades is inserted into two guide grooves 4402 of the other straight moving diaphragm blade 44 so that the other one of the pair of straight moving diaphragm blades 44 is overlapped on the two spacers 50. At the same time, the other drive pin 52D for the straight moving diaphragm blades is inserted into the elongate hole 4404 of the other straight moving diaphragm blade 44.

Subsequently, the other pivot 60 for the first swing diaphragm blades is inserted into the hole 4602 of the other first swing diaphragm blades 46 so that the other one of the pair of first swing diaphragm blades 46 may be overlapped on the other straight moving diaphragm blade 44. At the same time, the drive pin 52E for the other first swing diaphragm blades is inserted into the cam groove 4604 of the other first swing diaphragm blade 46.

Subsequently, the other pivot 62 for the second swing diaphragm blades is inserted into the hole 4802 of the other second swing diaphragm blade 48 so that the other one of the pair of second swing diaphragm blades 48 is overlapped on the other straight moving diaphragm blade 44 and the other first swing diaphragm blade 46. At the same time, the other drive pin 52F for the second swing diaphragm blades is inserted into the cam groove 4804 of the other second swing diaphragm blade 48.

Finally, as shown in FIG. 9, by mounting the lid member 56 to the base member 42 from the back of the base member 42, the lid member 56 covers the pair of straight moving diaphragm blades 44 mounted to the base member 42, the pair of first swing diaphragm blades 46, the pair of second swing diaphragm blades 48, and the two spacers 50.

As a result, as shown in FIG. 7, there are overlapped on the rear surface 42B of the base member 42, one of the second swing diaphragm blades 48, one of the first swing diaphragm blades 46, one of the straight moving diaphragm blades 44, the other one of the straight moving diaphragm blades 44, the other one of the first swing diaphragm blades 46, and the other one of the second swing diaphragm blades 48, in this order. At the same time, one of the spacers 50 is placed between one of the straight moving diaphragm blades 44 and the other one of the first swing diaphragm blades 46. Also, the other one of the spacers 50 is placed between one of the first swing diaphragm blades 46 and the other one of the straight moving diaphragm blades 44.

Moreover, of the two sets of pairs of swing diaphragm blades 46 and 48, one pair of swing diaphragm blades 46 and 48 is disposed on the front side, which is one of the two faces that the pair of straight moving diaphragm blades 44 oppose in the optical axis direction. Also, of the two sets of pairs of swing diaphragm blades 46 and 48, the other swing diaphragm blades 46 and 48 are disposed on the rear-surface side, which is the other face of the two sides to which the pair of straight moving diaphragm blades 44 oppose in the direction of an optical axis.

Moreover, the pair of straight moving diaphragm blades 44 are so provided at a portion to which the diaphragm aperture 2 is opposed as to slide along a plane orthogonal to the optical axis L in a direction of getting close to or separated from the optical axis L.

Also, the pair of first swing diaphragm blades 46 are so provided at a portion to which the diaphragm aperture 2 is opposed as to swing about a center axis in parallel to the optical axis L in a direction of getting close to or separated from the optical axis L.

Further, the pair of second swing diaphragm blades 48 are so provided at a portion to which the diaphragm aperture 2 is opposed so as to swing about a center axis in parallel to the optical axis L in a direction of getting close to or separated from the optical axis L.

Further, there is provided a drive mechanism which adjusts the size of the diaphragm aperture 2 by sliding the straight moving diaphragm blade 44 and by swinging the first and second swing diaphragm blades 46 and 48. The drive mechanism includes: the motor 54; the drive gear 54C; the gear part 53; and the annular plate 52.

Also, by the aperture-forming edges 44A of the straight moving diaphragm blades 44, the edge portion of the diaphragm aperture 2 in a direction in which the straight moving diaphragm blades 44 are slid is formed. By the aperture-forming edge 46A of the first swing diaphragm blade 46 and the aperture-forming edge 48A of the second swing diaphragm blade 48, an edge port-ion of the diaphragm aperture 2 in a direction orthogonal to the direction in which the straight moving diaphragm blades 44 are slid is formed.

Figure 8:
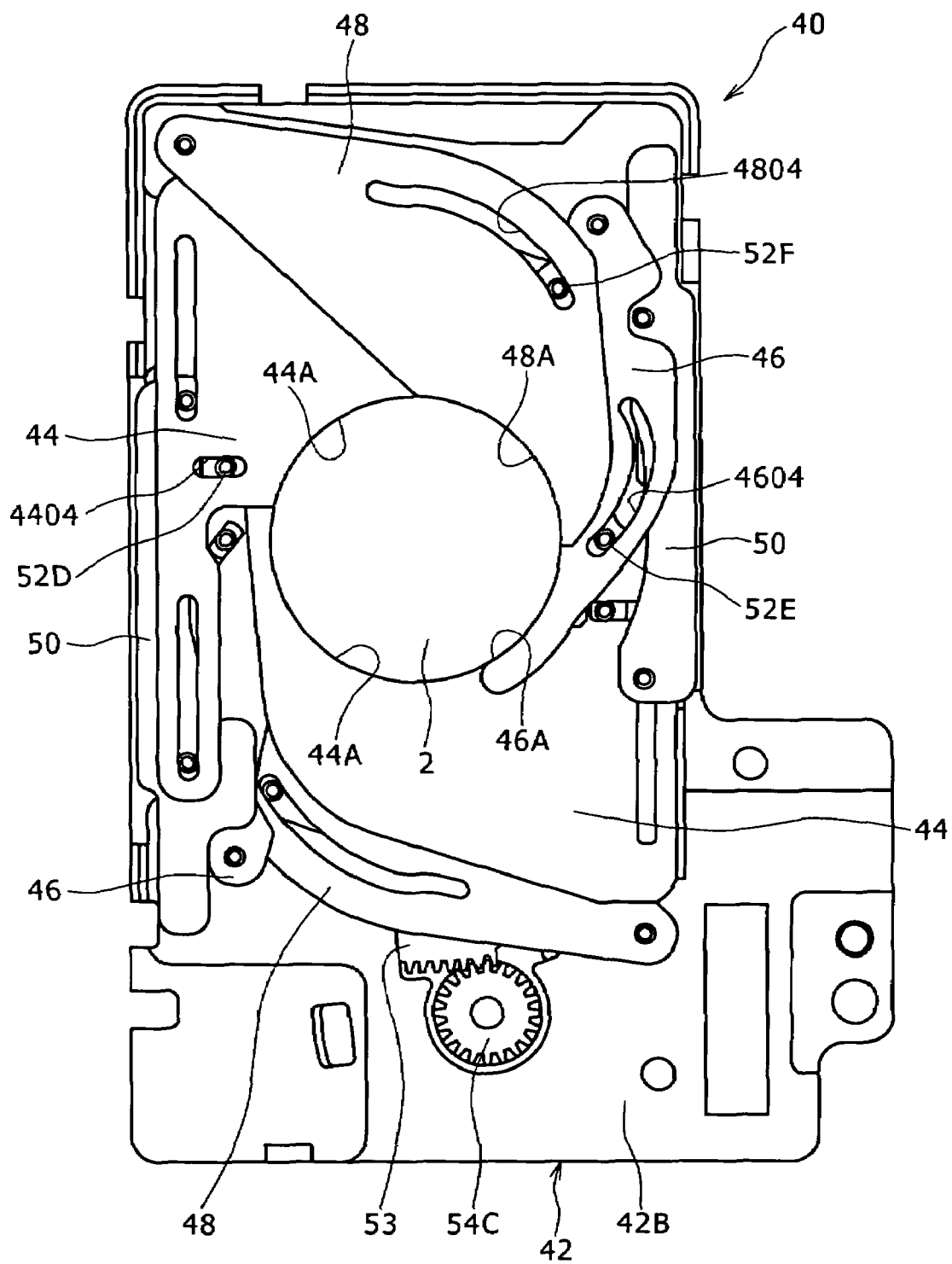
FIG. 8 is a plan view of the light amount adjuster showing a state where a diaphragm aperture is open as viewed from the back side.

Also, as shown in FIG. 8, a first pivot 60 for the first swing diaphragm blades (a swing fulcrum for the pair of first swing diaphragm blades 46) is located, as viewed in the direction of the optical axis, within an extended range of the moving trajectory of the pair of straight moving diaphragm blades 44.

Further, as shown in FIG. 8, the pivot 62 for the second swing diaphragm blades (a swing fulcrum for the pair of second swing diaphragm blades 48) is located as viewed in the direction of the optical axis, within an extended range of the moving trajectory of the pair of straight moving diaphragm blades 44.

Also, as shown in FIG. 8, the drive mechanism is located within an extended range of the moving trajectory of the pair of straight moving diaphragm blades 44 as viewed from the optical axis direction.

Now, workings of the light amount adjuster 40 will be described.

First, as shown in FIGS. 8 to 10, a case where the diaphragm aperture 2 is opened will be explained. The guide pin 58 for the straight moving diaphragm blades is positioned at one end of the longitudinal direction of the guide groove 4402 of the straight moving diaphragm blade 44. The drive pin 52E for the first swing diaphragm blades is positioned at one end of the longitudinal direction of the cam groove 4604 of the first swing diaphragm blade 46. The drive pin 52F for the second swing diaphragm blades is positioned at one end of the longitudinal direction of the cam groove 4804 of the second swing diaphragm blade 48.

In this state, the diaphragm aperture 2 is formed so as to be substantially circular by the aperture-forming edges 44A of the pair of straight moving diaphragm blades 44, the aperture-forming edges 46A of the pair of first swing diaphragm blades 46, and the aperture-forming edges 48A of the pair of second swing diaphragm blades 48.

Also, according to the present embodiment, in this open state, the diameter of the diaphragm aperture 2 is equivalent to the diameter of the hole 42C of the base member 42.

Figure 11:
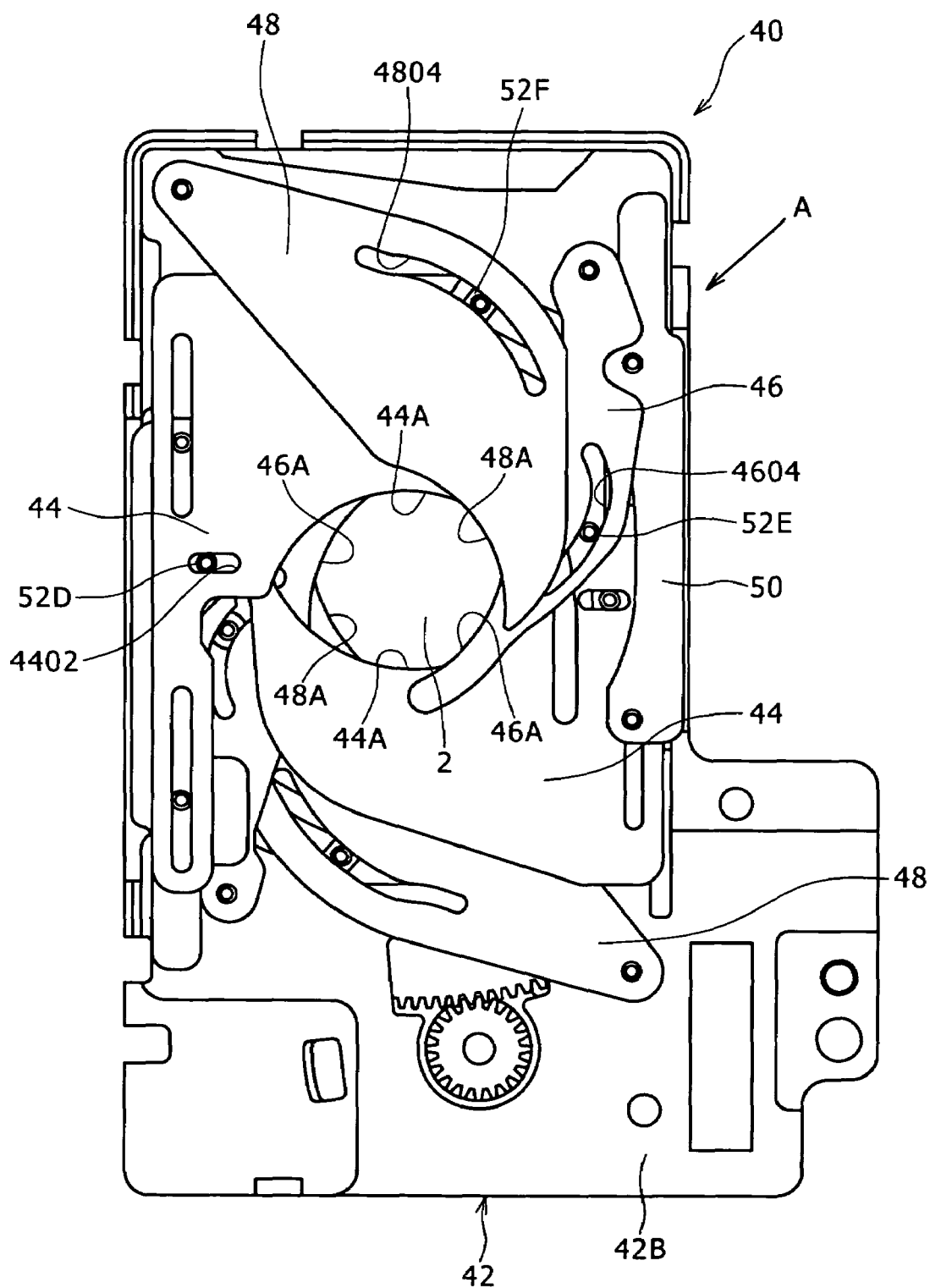
FIG. 11 is a plan view of the light amount adjuster showing a state where the diaphragm aperture is made smaller by one level as viewed from the back side.
Figure 12:
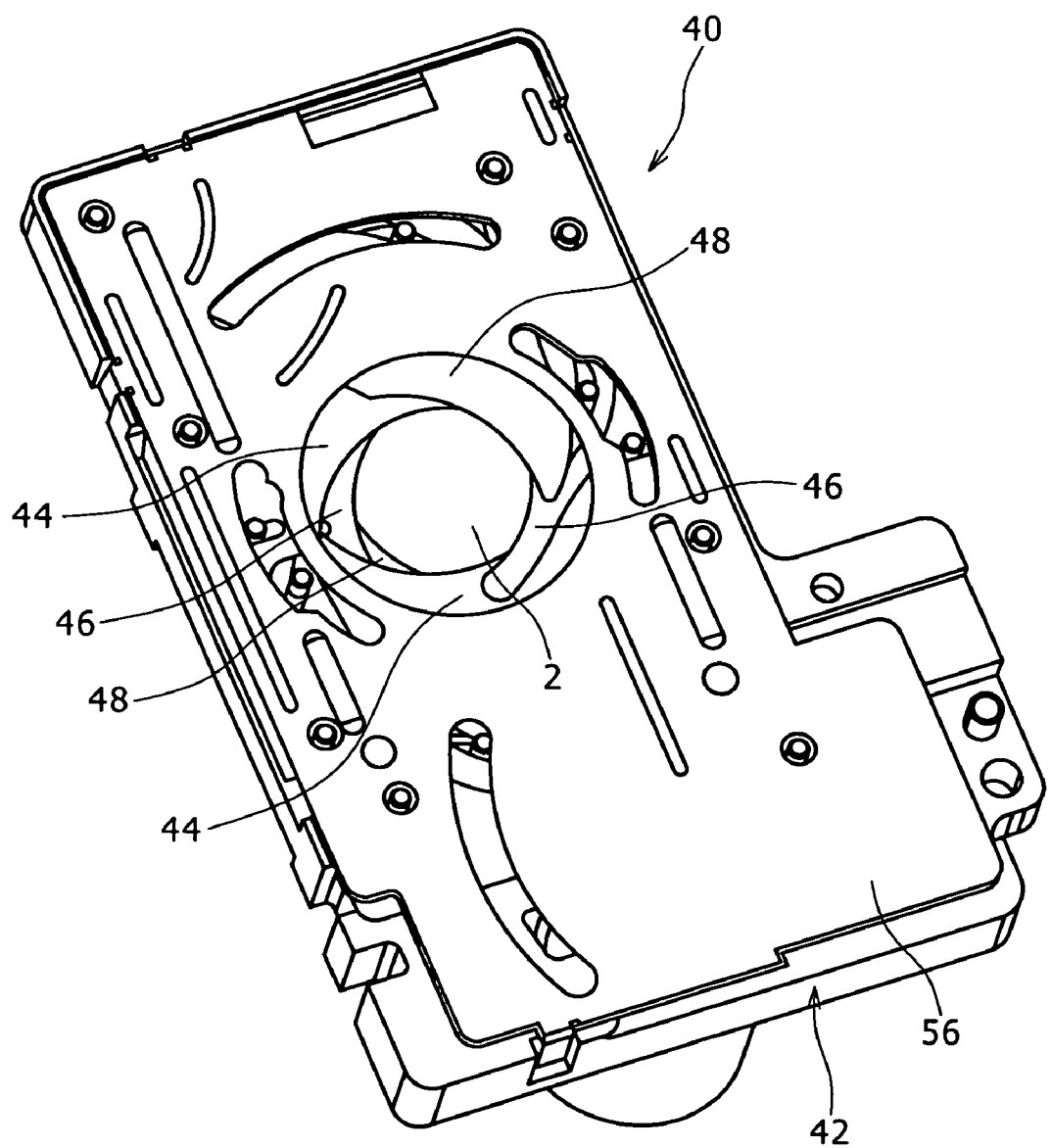
FIG. 12 is a perspective view of the light amount adjuster showing the state where the diaphragm aperture is made smaller by one level as viewed from the back side.
Figure 13:
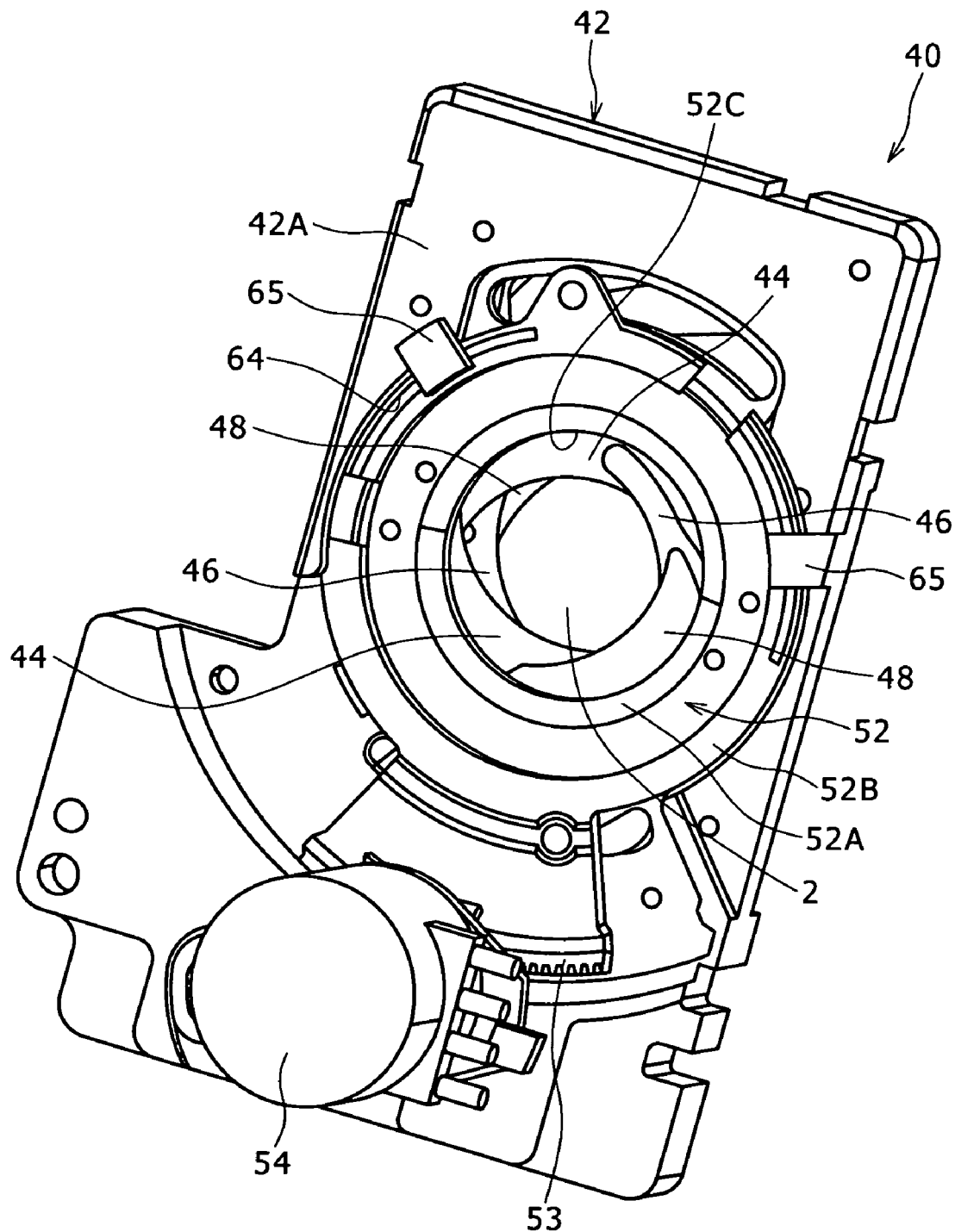
FIG. 13 is a perspective view of the light amount adjuster showing the state where the diaphragm aperture is made smaller by one level as viewed from the front side.

In this regard, when the motor 54 is rotated in a normal direction and the annular plate 52 is rotated a predetermined amount, the drive pin 52D for the straight moving diaphragm blade engaging the elongate hole 4404 of the pair of straight moving diaphragm blades 44 is swung. As a result, the straight moving diaphragm blade 44 slide(s) a predetermined amount through the guide groove 4402 and the guide pin 58 for the straight moving diaphragm blade engaging the guide groove 4402. Then, as shown in FIGS. 11 to 13, a space between the aperture-forming edges 44A of the opposing pair of straight moving diaphragm blades 44, namely, the diameter of the diaphragm aperture 2 is reduced.

Further, when the annular plate 52 is rotated by a predetermined amount, the drive pin 52E for the first swing diaphragm blades swings. As a result, the pair of first swing diaphragm blades 46 swing(s) by a predetermined amount about the pivot 60 for the first swing diaphragm blades through the cam groove 4604. Thus, as shown in FIGS. 11 or 13, a space between the aperture-forming edges 46A of the opposing pair of first swing diaphragm blades 46, namely, the diameter of the diaphragm aperture 2 is reduced.

Further, when the annular plate 52 is rotated by a predetermined amount, the drive pin 52F for the second swing diaphragm blades swings. Accordingly, through the cam groove 4804, the pair of second swing diaphragm blades 48 swings by a predetermined amount about the pivot 62 for the second swing diaphragm blades 62. Thus, as shown in FIGS. 11 to 13, a space between the aperture-forming edges 48A of the opposing pair of two swing diaphragm blades 48, namely, the diameter of the diaphragm aperture 2 is reduced.

In this regard, the space between the aperture-forming edges 44A of the pair of straight moving diaphragm blades 44, the space between the aperture-forming edges 46A of the pair of first swing diaphragm blades 46, and the space between the aperture-forming edges 48A of the pair of second swing diaphragm blades 48 are substantially identical. That is, the diameter of the diaphragm aperture 2 formed by the pair of straight moving diaphragm blades 44, the diameter of the diaphragm aperture 2 formed by the pair of first swing diaphragm blades 46, and the diameter of the diaphragm aperture 2 formed by the pair of second swing diaphragm blades 48 are identical, reducing the diaphragm aperture 2 formed by the aperture-forming edge 44A of the pair of straight moving diaphragm blades 44, the aperture-forming edge 46A of the pair of first swing diaphragm blades 4.6, and the aperture-forming edge 48A of the pair of second swing diaphragm blades 48. In the case of FIGS. 11 or 13, the diaphragm aperture 2 is made smaller by one level. The form of the diaphragm aperture 2 is made to be substantially regular hexagonal by the aperture-forming edges 44A, 46A, and 48A.

Further, in a process from the open state of FIG. 8 to the state of FIG. 11 when the diaphragm aperture 2 is made small by one level, the shape of the diaphragm aperture 2 continuously changes from being substantially circular to substantially hexagonal.

Figure 14:
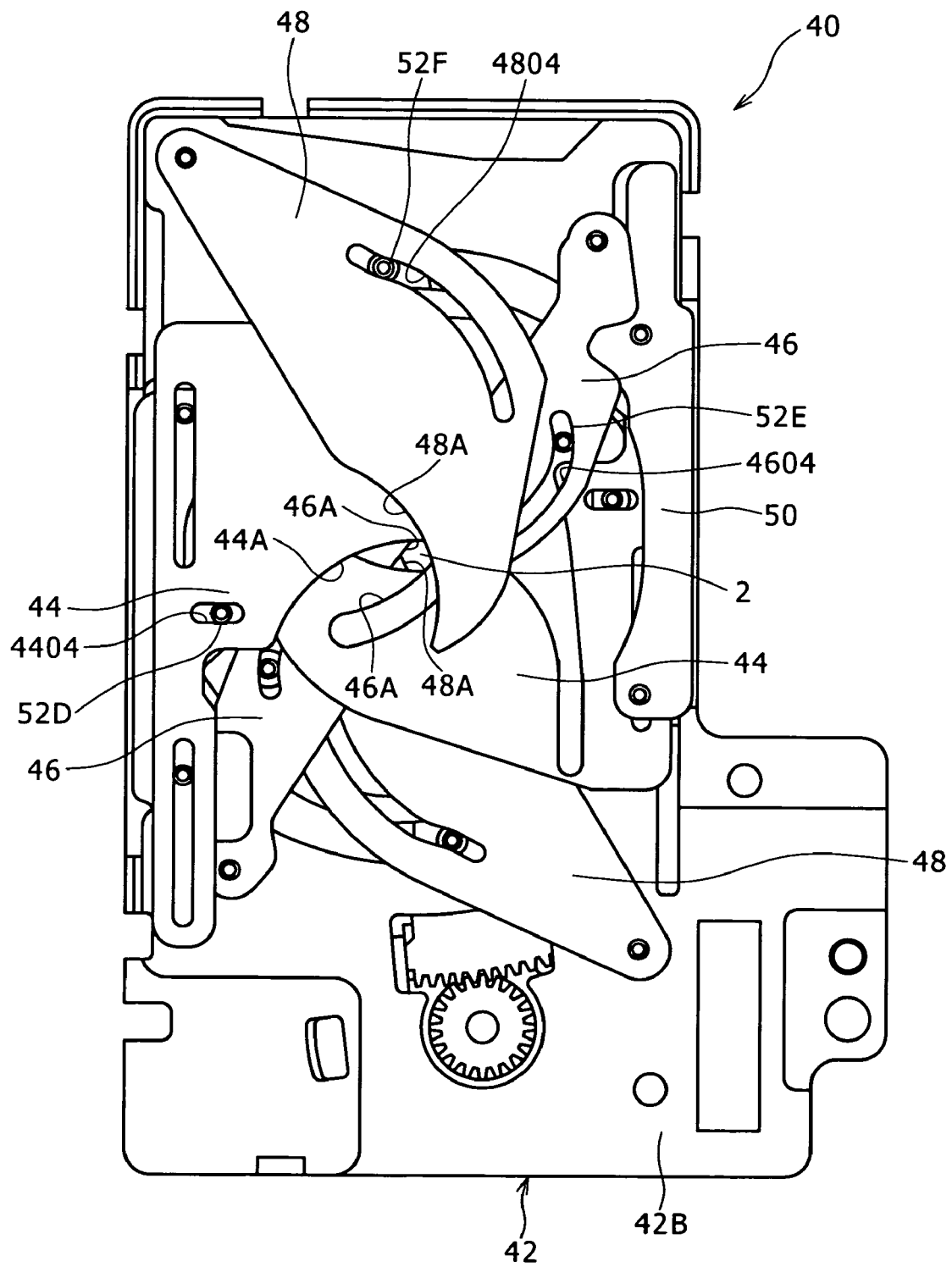
FIG. 14 is a plan view of the light amount adjuster showing a state where the diaphragm aperture is made smaller by six levels as viewed from the back side.
Figure 15:
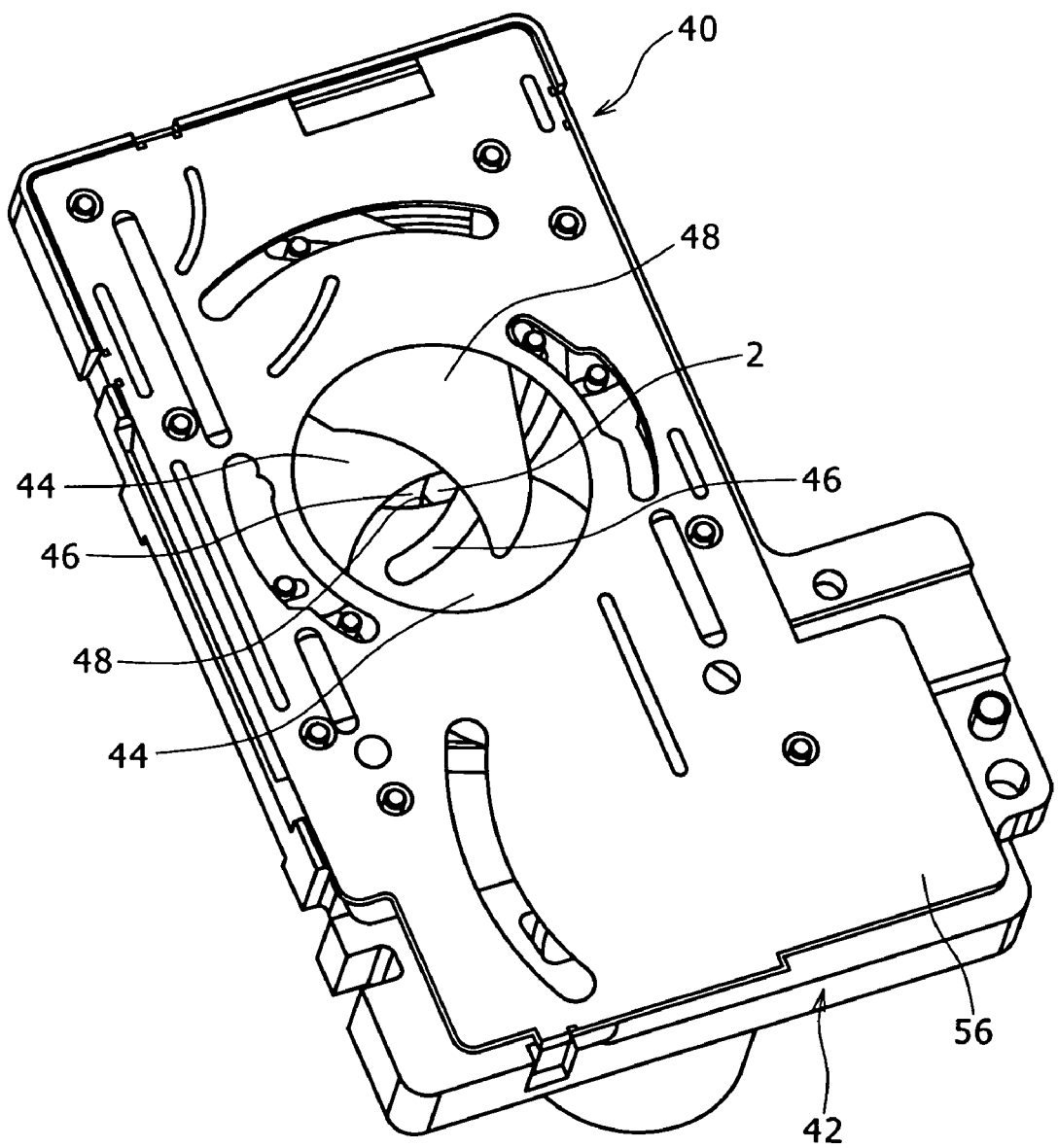
FIG. 15 is a perspective view of the light amount adjuster showing the state where the diaphragm aperture is made smaller by six levels as viewed from the back side.
Figure 16:
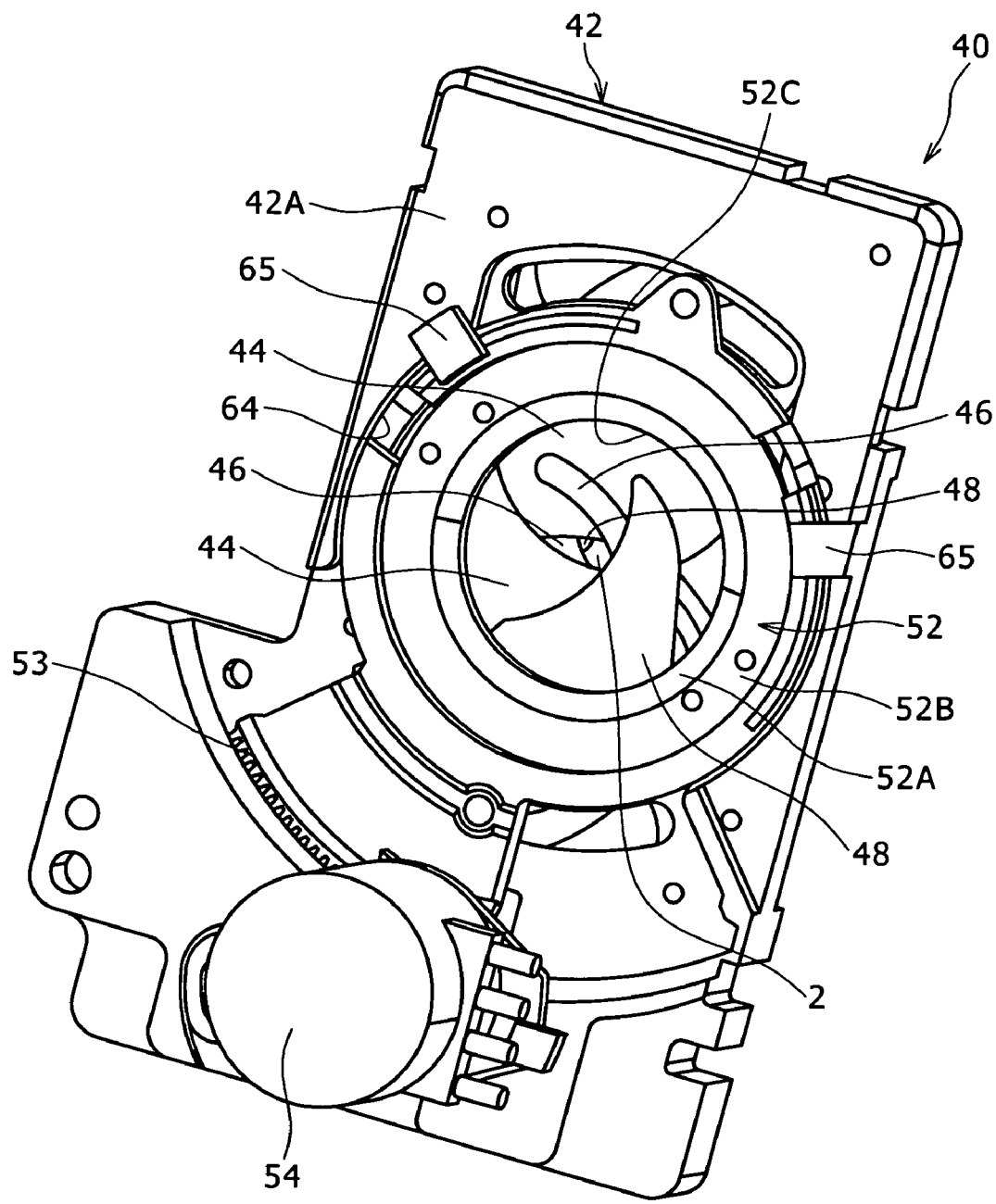
FIG. 16 is a perspective view of the light amount adjuster showing the state where the diaphragm aperture is made smaller by six levels as viewed from the front side.

From the state of FIGS. 11 to 13, when the motor 54 is further rotated in the normal direction and the annular plate 52 is further rotated, in the same operation as above, the pair of straight moving diaphragm blades 44 slide. At the same time, the pair of first swing diaphragm blades 46 and the pair of second swing diaphragm blades 48 swing, which, as shown in FIGS. 14 to 16, makes smaller the diaphragm aperture 2 formed by the aperture-forming edges 44A of the pair of straight moving diaphragm blades 44, the aperture-forming edges 46A of the pair of first swing diaphragm blades 46, and the aperture-forming edges 48A of the pair of second swing diaphragm blades 48. In the case of FIGS. 14 to 16, the diaphragm aperture 2 is made smaller by six levels, and the shape of the diaphragm aperture 2 is made to be substantially hexagonal by the aperture-forming edges 44A, 46A, and 48A.

From the state of FIGS. 14 to 16, when the motor 54 is further rotated in the normal direction and the annular plate 52 is further rotated as in the same operation described above, the pair of straight moving diaphragm blades 44 slide. At the same time, the first and second swing diaphragm blades 46 and 48 swing, which makes smaller the diaphragm aperture 2 formed by the aperture-forming edges 44A of the pair of straight moving diaphragm blades 44, the aperture-forming edges 46A of the pair of first swing diaphragm blades 46, and the aperture-forming edges 48A of the pair of second swing diaphragm blades 48. Shortly, as shown in FIGS. 17 to 19, a fully closed state of the diaphragm aperture 2 is formed.

In this fully closed states, the guide pin 58 for the straight moving diaphragm blades is positioned at the other end of the longitudinal direction of the guide groove 4402 of the pair of straight moving diaphragm blades 44. The drive pin 52E for the first swing diaphragm blades is positioned at the other end of the longitudinal direction of the cam groove 4604 of the pair of first swing diaphragm blades 46. The drive pin 52F for the second swing diaphragm blades is positioned at the other end of the longitudinal direction of the cam groove 4804 of the pair of second swing diaphragm blades 48.

Figure 17:
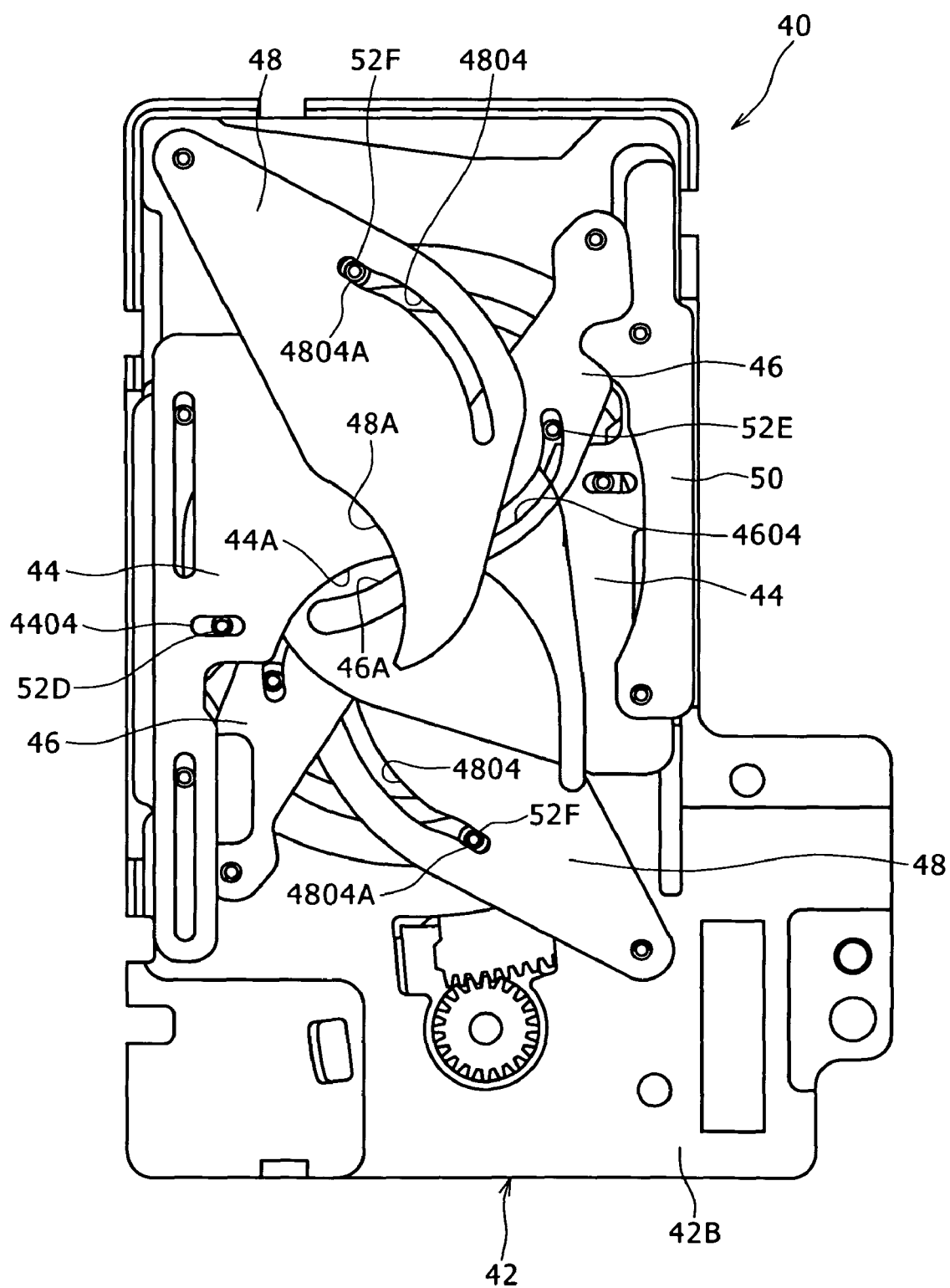
FIG. 17 is a plan view of the light amount adjuster showing a state where the diaphragm aperture is fully closed as viewed from the back side.
Figure 18:
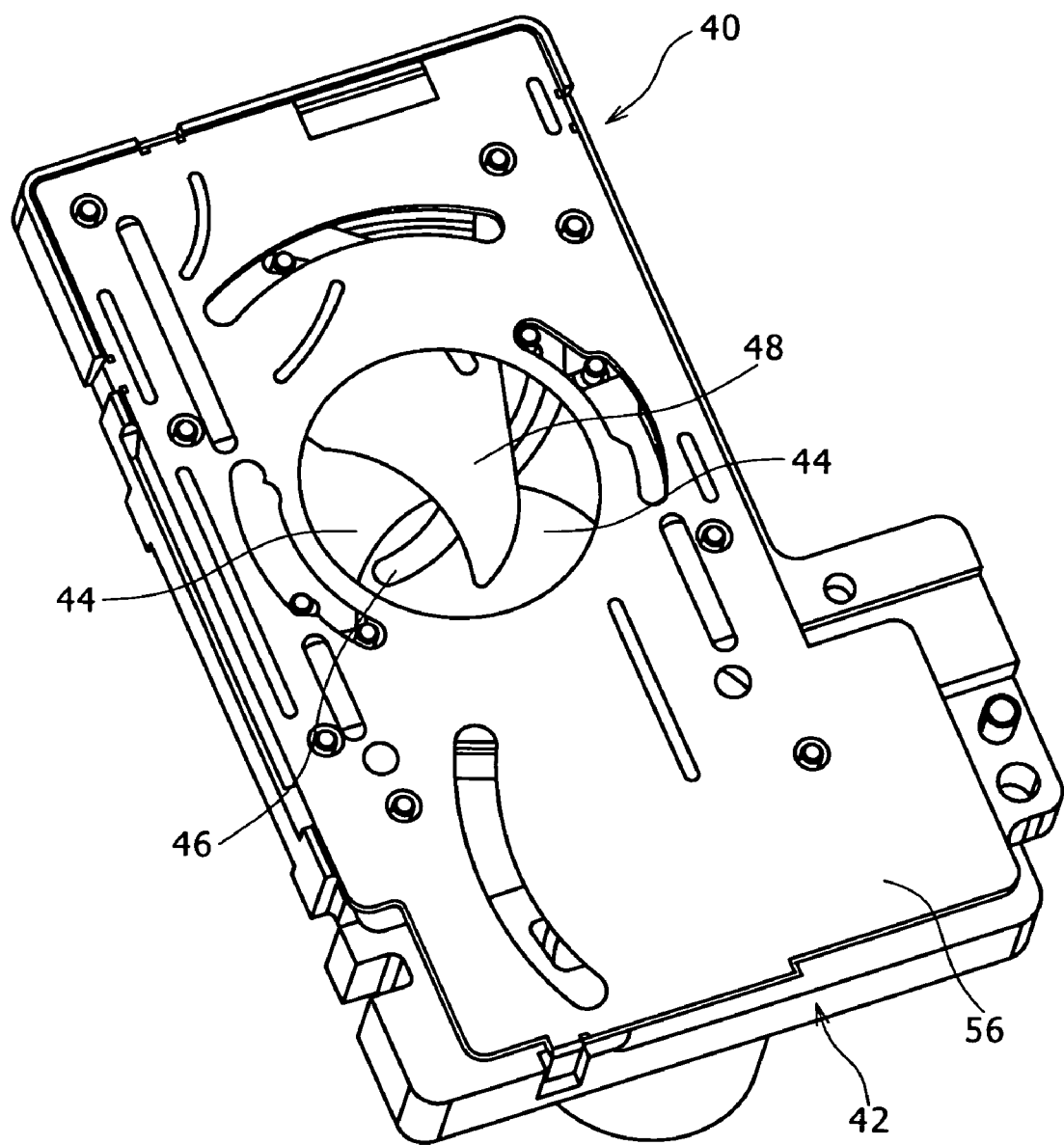
FIG. 18 is a perspective view of the light amount adjuster showing the state where the diaphragm aperture is fully closed as viewed from the back side.
Figure 19:
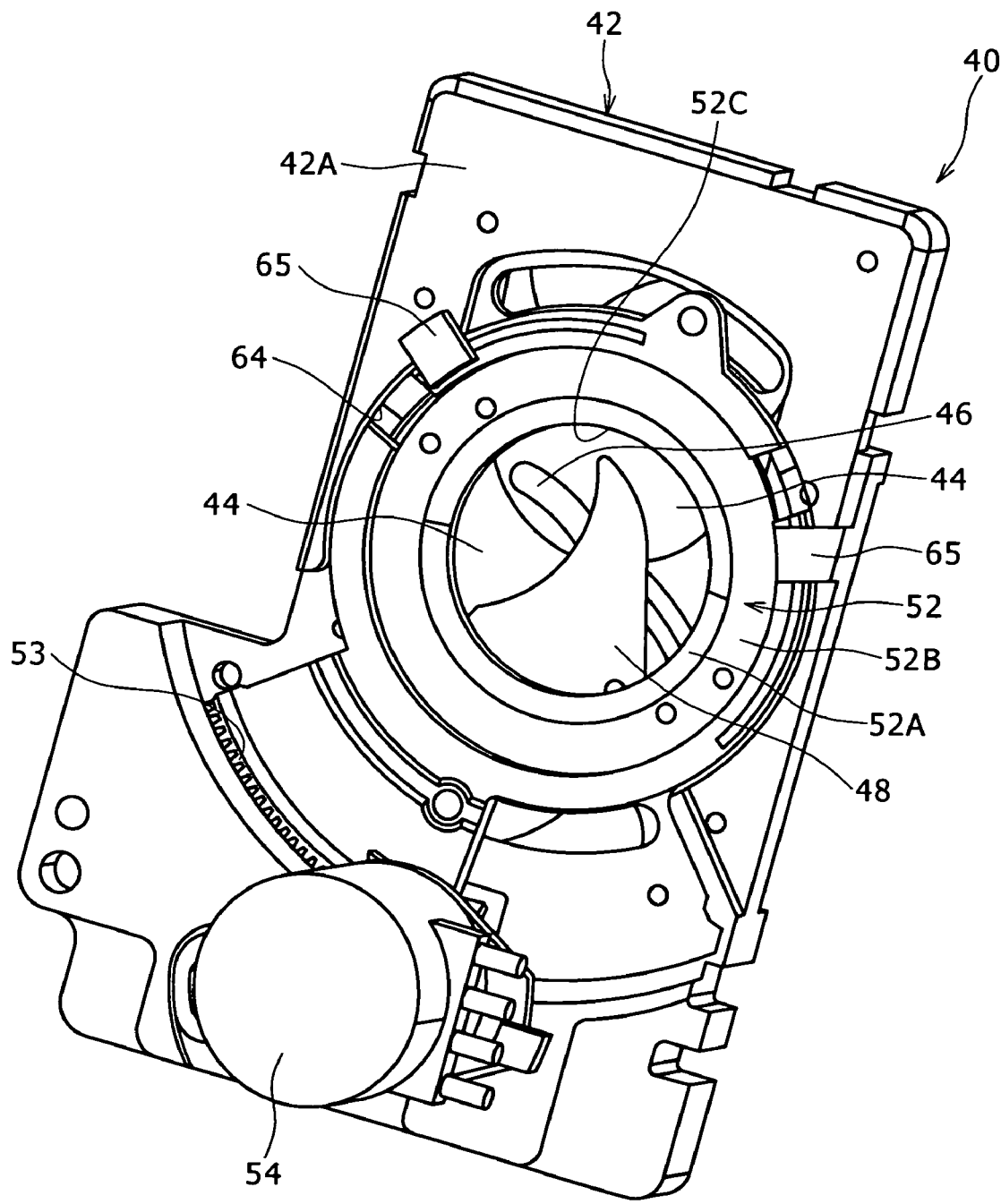
FIG. 19 is a perspective view of the light amount adjuster showing the state where the diaphragm aperture is fully closed as viewed from the front side.

From the fully closed state of FIGS. 17 to 19, when the motor 54 is rotated in the reverse direction, and the annular plate 52 is rotated in the opposite direction of the above, the pair of straight moving diaphragm blades 44 slide in the opposite direction of the above. At the same time, the pair of first swing diaphragm blades 46 and the pair of second swing diaphragm blades 48 swing in the opposite direction of the above. Accordingly, the diaphragm aperture 2 is formed by the aperture-forming edges 44A of the pair of straight moving diaphragm blades 44, the aperture-forming edges 46A of the pair of first swing diaphragm blades 46, and the aperture-forming edges 48A of the pair of second swing diaphragm blades 48. Thus, as shown in FIGS. 14 or 16, the diaphragm aperture 2 is formed. When the motor 54 is rotated in the reverse direction, the diaphragm aperture 2 is gradually enlarged. Shortly, as shown in FIGS. 8 to 10, the open state of the diaphragm aperture 2 is achieved.

In a process from the state where the diaphragm aperture 2 is made smaller by one level as in FIG. 11 to the open state of FIG. 8, the shape of the diaphragm aperture 2 continually changes from being substantially hexagonal to substantially circular.

Thus, by controlling the direction of rotation and the amount of rotation of the motor 54, the diaphragm aperture 2 of the light amount adjuster 40 is adjusted in a range between the fully open state and the fully closed state.

Now, a function of the spacer 50 will be described.

Figure 25:
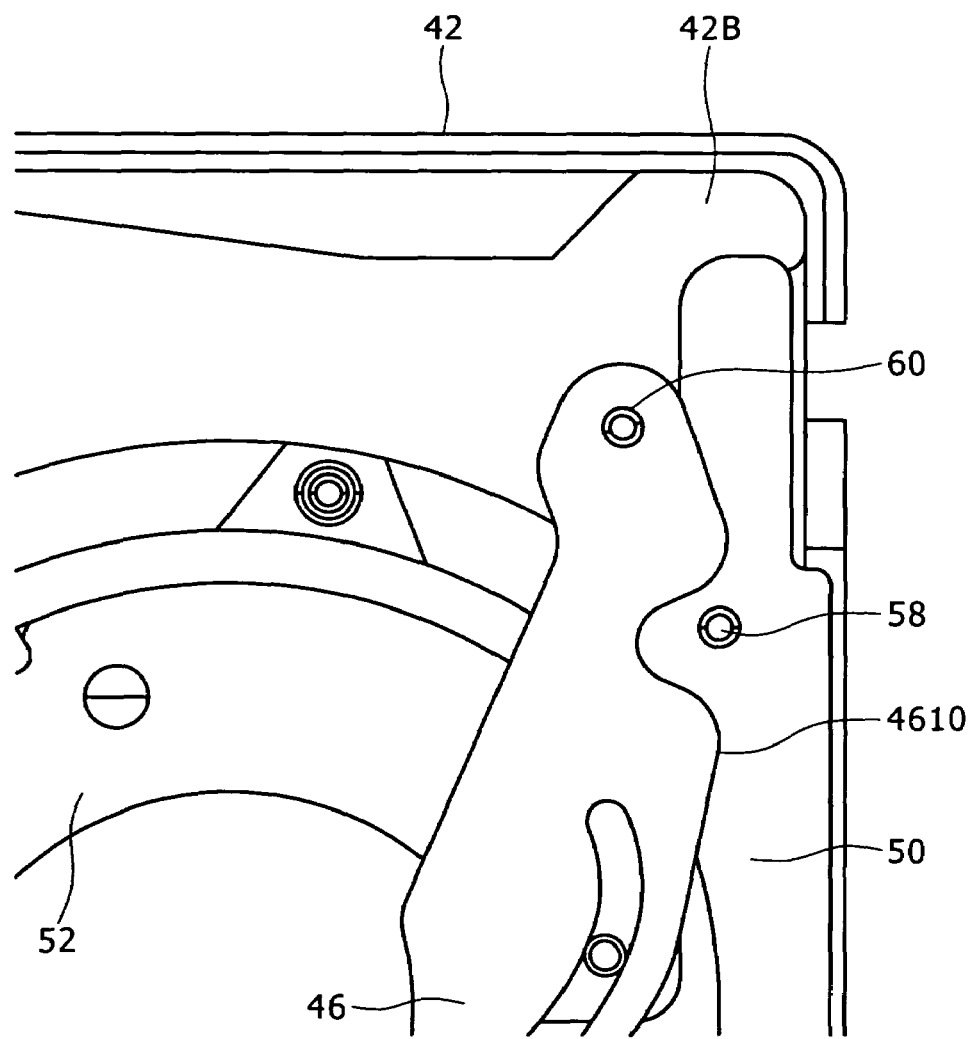
FIG. 25 is an enlarged view on an arrow A in FIG. 11.
Figure 26:
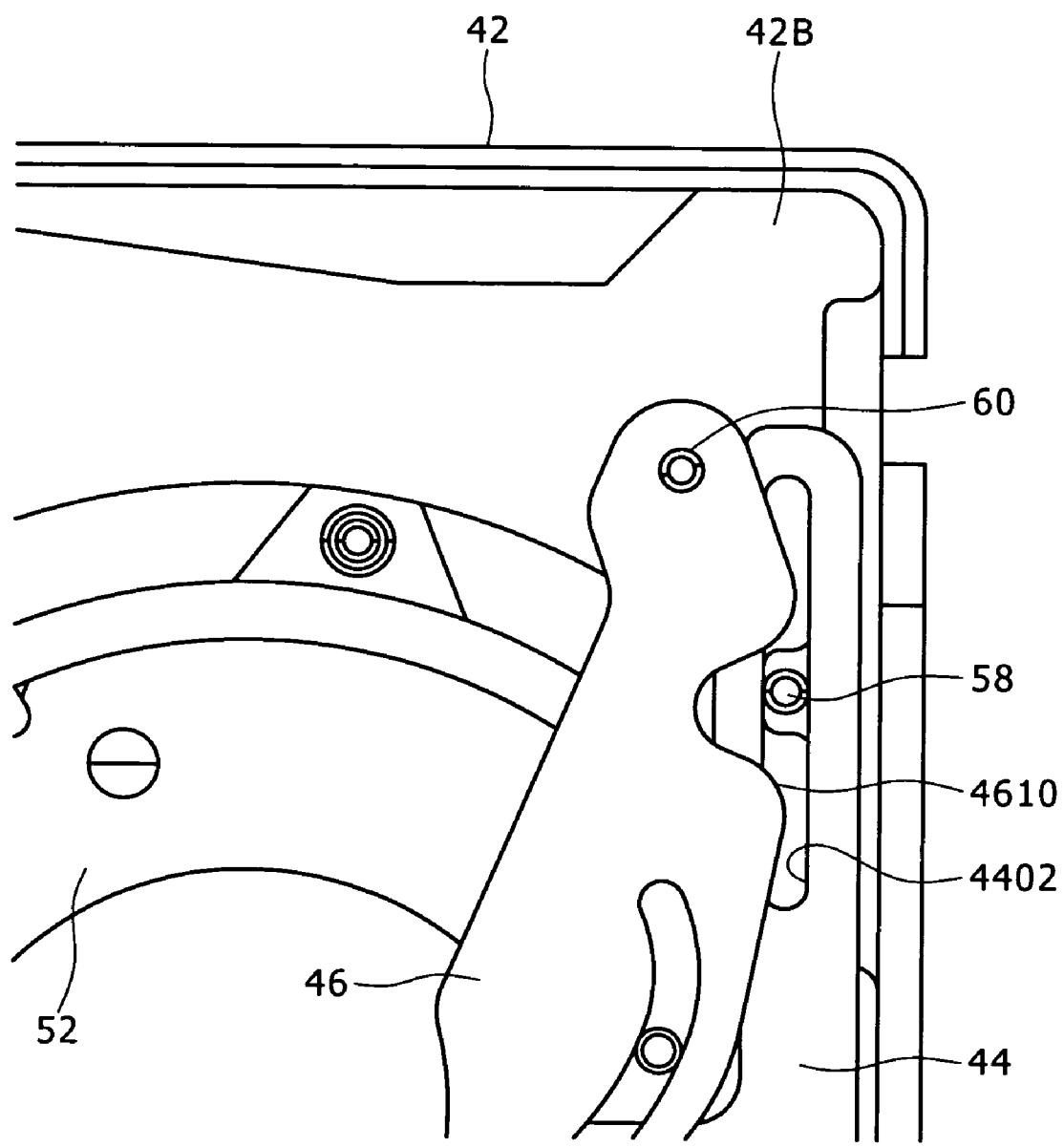
FIG. 26 is an enlarged view on an arrow A in FIG. 11 without the spacer.

FIG. 25 is an enlarged view on an arrow A in FIG. 11. FIG. 26 is an enlarged view on an arrow A in FIG. 11 without the spacer 50.

An edge 4610 of the other one of the two second swing diaphragm blades 46 faces the guide groove 4402 of the other one of the two straight moving diaphragm blades 44. Therefore, as shown in FIG. 26, when one of the two spacers 50 is not provided, when the edge 4610 swings in a direction of approaching the guide groove 4402, the edge 4610 may interfere with the edge of the guide groove 4402 to prevent the smooth swing of the second swing diaphragm blades 46.

According to the present embodiment, as shown in FIG. 25, the spacer 50 is placed between the guide groove 4402 of one straight moving diaphragm blade 44 and the edge 4610 of the other second swing diaphragm blade 46. That is, by separating the straight moving diaphragm blade 44 and the second swing diaphragm blade 46 in their thickness direction by use of the spacer 50, the interference between the edge 4610 and the guide groove 4402 is prevented, allowing the other one of the two swing diaphragm blades 46 to swing smoothly.

As shown in FIG. 11, the other one of the two spacers 50 is placed between the guide groove 4402 of the other one of the two straight moving diaphragm blades 44 and the edge 4610 of one of the two swing diaphragm blades 46, which, in the same way as described above, allows one of the two swing diaphragm blades 46 to swing smoothly.

As described above, according to the present embodiment, there are provided the pair of straight moving diaphragm blades 44, the pair of first swing diaphragm blades 46, and the pair of second swing diaphragm blades 48. Then, the size of the diaphragm aperture 2 is adjusted by sliding the straight moving diaphragm blades 44 and allowing the first and second swing diaphragm blades 46 and 48 to swing. Therefore, regardless of the size of the diaphragm aperture 2, the shape of the diaphragm aperture 2 to be formed can be made to be substantially circular or substantially hexagonal.

Figure 27A:
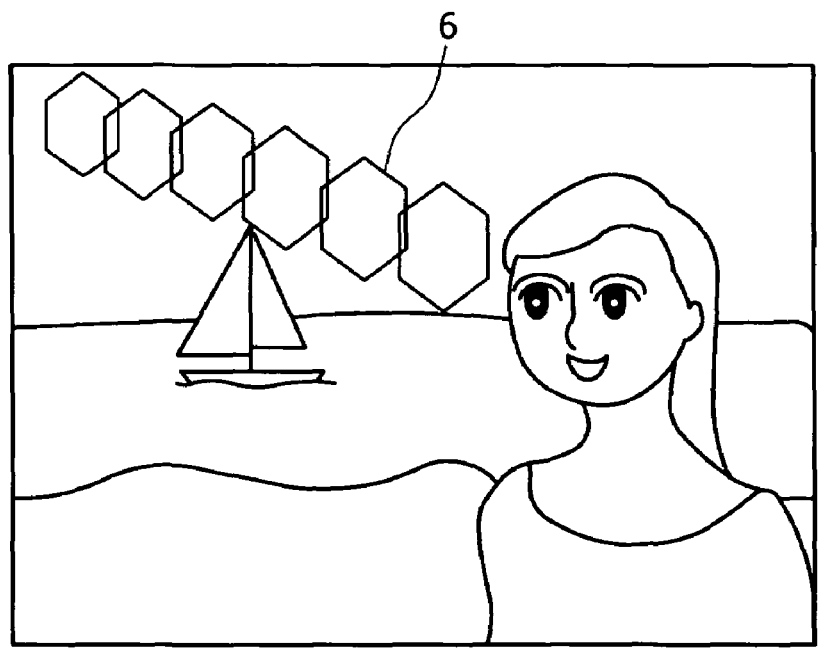
FIG. 27A is an explanatory view showing a ghost in the shape of the aperture in an iris diaphragm.
Figure 27B:
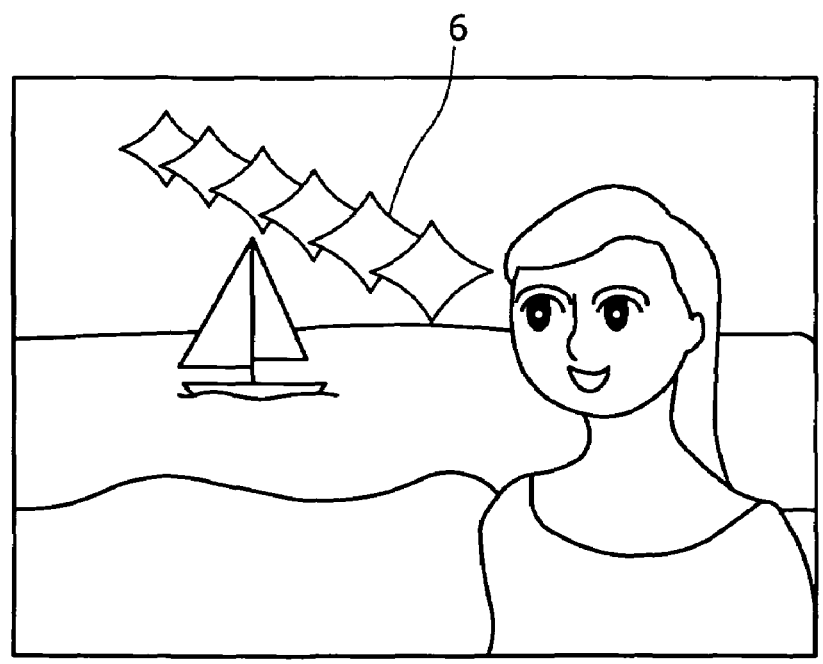
FIG. 27B is an explanatory view showing a ghost in the shape of the aperture formed by two diaphragm blades.

Therefore, as compared to a light amount adjuster using an iris diaphragm which swings a plurality of diaphragm blades in an interlocking manner, a space around the diaphragm aperture 2 can be reduced. As a result, the size of the light amount adjuster 40 can be reduced. Further, it is advantageous in reducing the sizes of the lens barrel 16 and the image pickup device 10. Also, regardless of the size of the diaphragm aperture 2, the shape of the diaphragm becomes substantially circular or regular polygonal. Accordingly, as shown in FIG. 27A, the shape of the ghost 6 or defocusing becomes substantially circular or substantially regular polygonal. Therefore, a visually natural image can be photographed, being advantageous in improving the value of the product.

Therefore, the light amount adjuster 10 according to the present embodiment can be incorporated into the lens barrel 16 to which an iris diaphragm device could not be mounted in the past. In particular, the shape of the diaphragm aperture 2 formed around the opened diaphragm can be made circular, achieving the favorable shape of the diaphragm aperture 2 equivalent to the iris diaphragm.

As above, regardless of the size of the diaphragm aperture 2, the shape of the diaphragm aperture 2 can be made substantially circular or substantially regular hexagonal. Therefore, as compared to a light amount adjuster in the past, whose shape of the diaphragm aperture becomes rhombic, diffraction deterioration caused by the light beam reflected at the edge of the diaphragm blades (edge portion of the diaphragm aperture) can be suppressed, being advantageous in improving resolution of the photographed image.

According to the present embodiment, the pivot 60 for the first swing diaphragm blades (swing fulcrum for the pair of first swing diaphragm blades 46) is so provided as to be positioned within an extended range of the moving trajectory of the pair of straight moving diaphragm blades 44 as viewed in the optical axis direction. The pivot 62 for the second swing diaphragm blades (swing fulcrum for the pair of second swing diaphragm blades 48) is so provided as to be positioned within an extended range of the moving trajectory of the pair of straight moving diaphragm blades 44 as viewed in the optical axis direction. As viewed in the optical axis direction, the drive mechanism is positioned within an extended range of the moving trajectory of the pair of straight moving diaphragm blades 44, which is advantageous in reducing the space on both sides in the direction in which the straight moving diaphragm blades 44 make linear reciprocating movement, and is further advantageous in reducing sizes of the light amount adjuster 40, lens barrel 16, and image pickup device 10.

Further, the light amount adjuster in the past adopting an iris diaphragm has a complicated structure of diaphragm blades, which is disadvantageous in reliably forming the fully closed state.

On the other hand, according to the light amount adjuster 40 according to the present embodiment, by using the pair of straight moving diaphragm blades 44, the pair of first swing diaphragm blades 46, and the pair of second swing diaphragm blades 48, the fully closed state of the diaphragm aperture 2 can easily be formed, achieving a mechanical shutter by use of the light amount adjuster 40.

Also, when realizing the mechanical shutter, it is necessary, when closing the shutter, to form promptly and reliably the fully closed state of the diaphragm aperture 2. In other words, it is necessary to overlap the straight moving diaphragm blades 44 and the first and second swing diaphragm blades 46 and 48 in their thickness direction promptly and reliably.

According to the present embodiment, as shown in FIG. 17, there is provided a cam groove portion 4808A in the cam groove 4804 of the second swing diaphragm blade 48 which increases the swing speed of the second swing diaphragm blade 48 when the second swing diaphragm blade 48 moves from the swing position immediately before its fully closed state to the swing position corresponding to its fully closed state, ensuring the function of the mechanical shutter.

Further, according to the present embodiment, in a state where the cam groove 4604 of the first swing diaphragm blade 46 is provided inside the hole 42C of the base member 42, the cam groove 4604 is covered with the straight moving diaphragm blade 44 and the second swing diaphragm blades 48. Also, in a state where the cam groove 4804 of the second swing diaphragm blade 48 is provided inside the hole 42C of the base member 42, the cam groove 4804 is covered with the straight moving diaphragm blades 44 and the first swing diaphragm blade 46.

Therefore, it is possible to reliably prevent the light passing through the cam groove positioned inside the hole 42C of the base member 42 from reaching the image pickup element 18, being advantageous in securing the quality of the image taken by the image pickup element 18.

Moreover, according to the present embodiment, pairs of diaphragm blades 44, 46 and 48 interposing the optical axis L are so disposed as to be point symmetrical about the optical axis L. That is, the pair of straight moving diaphragm blades 44, the pair of first swing diaphragm blades 46, and the pair of second swing diaphragm blades 48 are respectively disposed such that respective pairs become symmetrical in the overlapping direction.

Thus, the interference between the pair of diaphragm blades being opposed to each other and interposing the optical axis L is prevented, being advantageous in smoothing the opening/closing operation of the diaphragm blades.

In the present embodiment, the case has been described in which there is provided the drive mechanism including the motor 54 and the annular plate 52 which slides the straight moving diaphragm 44 and swings the first and second diaphragm blades 46 and 48. Needless to say, however, various constructions known in the past may be adopted, such as using a link mechanism as a drive mechanism.

Also, according to the present embodiment, the case has been described in which the light amount adjuster 40 includes: the pair of straight moving diaphragm blades 44, the pair of first swing diaphragm blades 46, and the pair of second swing diaphragm blades 48, namely, six diaphragm blades in all. However, the light amount adjuster 40 may include the pair of straight moving diaphragm blades and the pair of swing diaphragm blades. In such a case, two or more sets of the pairs of swing diaphragm blades may be provided. In short, the total number of the diaphragm blades may be four, eight, or more.

In the present embodiment, the case where the image pickup device is a video camera has been described. However, the embodiment according to of the present invention can be widely applied to devices such as a digital still camera, a cellular phone with a built-in camera, and a monitor camera.

Also, according to the present embodiment, the case where the light amount adjuster is applied to the image pickup device has been described. However, the present invention is not limited to the above. For example, the light amount adjuster according to the present invention may be used as a light amount adjuster for a light source in a projector unit.

It should be understood by those skilled in the art that various modifications, combinations, sub-combinations and alterations may occur depending on design requirements and other factors insofar as they are within the scope of the appended claims or the equivalents thereof.

What is claimed is:

1. A light amount adjuster for adjusting a size of a diaphragm aperture on an optical axis of an optical system, the light amount adjuster comprising:
   a pair of straight moving diaphragm blades so provided at a portion to which the diaphragm aperture is opposed as to slide along a plane orthogonal to the optical axis in a direction of getting close to or separated from the optical axis;
   a pair of swing diaphragm blades so provided at a portion to which the diaphragm aperture is opposed as to swing about a center axis in parallel to the optical axis in a direction of getting close to or separated from the optical axis; and
   a drive mechanism for adjusting the size of the diaphragm aperture by sliding the pair of straight moving diaphragm blades and by allowing the pair of swing diaphragm blades to swing,
   wherein there is provided a plurality of the pairs of swing diaphragm blades,
   one of the swing diaphragm blades of each pair of swing diaphragm blades of the plurality of pairs is provided on one face of the two faces to which the pair of straight moving diaphragm blades are opposed in the optical axis direction, and
   the other one of the swing diaphragm blades of each pair of swing diaphragm blades of the plurality of pairs is provided on the other face of the two faces to which the pair of straight moving diaphragm blades are opposed in the optical axis direction.

2. A light amount adjuster according to claim 1,
   wherein: one of the pair of swing diaphragm blades is provided on one of the two faces to which the pair of straight moving diaphragm blades are opposed in the optical axis direction; and
   the other one of the pair of swing diaphragm blades is provided on the other one of the two faces to which the pair of straight moving diaphragm blades are opposed in the optical axis direction.

3. A light amount adjuster according to claim 1,
   wherein: two straight moving diaphragm blades making up the pair of straight moving diaphragm blades are disposed so as to be point symmetrical about the optical axis; and
   two swing diaphragm blades making up the pair of swing diaphragm blades are so disposed as to be point symmetrical about the optical axis.

4. A light amount adjuster according to claim 1, wherein a swing fulcrum of the pair of swing diaphragm blades is located within an extended range of a moving trajectory of the pair of straight moving diaphragm blades as viewed in the optical axis direction.

5. A light amount adjuster according to claim 1,
   wherein: the straight moving diaphragm blades and the swing diaphragm blades have arc-like aperture-forming edges; and
   the diaphragm aperture is formed by the aperture-forming edges of the straight moving diaphragm blades and the swing diaphragm blades.

6. A light amount adjuster according to claim 1,
   wherein the straight moving diaphragm blades and the swing diaphragm blades have arc-like aperture forming edges, the diaphragm aperture is formed by the aperture-forming edges of the straight moving diaphragm blades and the swing diaphragm blades,
   an edge portion of the diaphragm aperture in a direction in which the straight moving diaphragm blades are slid is formed by the aperture-forming edges of the straight moving diaphragm blades, and
   an edge portion of the diaphragm aperture in a direction orthogonal to the direction in which the straight moving diaphragm blades are slid is formed by the aperture-forming edges of the swing diaphragm blades.

7. A light amount adjuster according to claim 6, wherein the diaphragm aperture formed by the aperture-forming edges of the straight moving diaphragm blades and the swing diaphragm blades is substantially circular or substantially hexagonal.

8. A light amount adjuster according to claim 1, wherein, as viewed in the optical axis direction, the drive mechanism is positioned within an extended range of a moving trajectory of the pair of straight moving diaphragm blades.

9. A light amount adjuster for adjusting a size of a diaphragm aperture on an optical axis of an optical system, the light amount adjuster comprising:
   a pair of straight moving diaphragm blades so provided at a portion to which the diaphragm aperture is opposed as to slide along a plane orthogonal to the optical axis in a direction of getting close to or separated from the optical axis;
   a pair of swing diaphragm blades so provided at a portion to which the diaphragm aperture is opposed as to swing about a center axis in parallel to the optical axis in a direction of getting close to or separated from the optical axis; and
   a drive mechanism for adjusting the size of the diaphragm aperture by sliding the pair of straight moving diaphragm blades and by allowing the pair of swing diaphragm blades to swing,
   wherein the light amount adjuster includes a base member, a hole is provided in the base member on the optical axis, the base member is provided with guide pins for straight moving diaphragm blades which support the pair of straight moving diaphragm blades respectively in a slidable manner and pivots for swing diaphragm blades which support the pair of swing diaphragm blades respectively such that they are able to swing, the drive mechanism comprises, on the base member, an annular plate provided rotatably about the optical axis and a motor for rotating the annular plate, and the annular plate is provided with drive pins for straight moving diaphragm blades which allow the pair straight moving diaphragm blades to slide respectively and drive pins for swing diaphragm blades which allow the pair of swing diaphragm blades to swing.

10. A lens barrel having a light amount adjuster for adjusting a size of a diaphragm aperture on an optical axis of an optical system, the light amount adjuster comprising:

a pair of straight moving blades so provided at a portion to which the diaphragm aperture is opposed as to slide along a plane orthogonal to the optical axis in a direction of getting close to or separated from the optical axes;

a pair of swing diaphragm blades so provided at a portion to which the diaphragm aperture is opposed as to swing about a center axis in parallel to the optical axis in a direction of getting close to or separated from the optical axis; and a drive mechanism for adjusting the size of the diaphragm aperture by sliding the pair of straight moving diaphragm blades and by allowing the pair of swing diaphragm blades to swing, wherein there is provided a plurality of the pairs of swing diaphragm blades, one of the swing diaphragm blades of each pair of swing diaphragm blades of the plurality of pairs is provided on one face of the two faces to which the pair of straight moving diaphragm blades are opposed in the optical axis direction, and the other one of the swing diaphragm blades of each pair of swing diaphragm blades of the plurality of pairs is provided on the other face of the two faces to which the pair of straight moving diaphragm blades are opposed in the optical axis direction.

11. An image pickup device having a light amount adjuster for adjusting a size of a diaphragm aperture on an optical axis of an optical system, the light amount adjuster comprising:

a pair of straight moving blades so provided at a portion to which the diaphragm aperture is opposed as to slide along a plane orthogonal to the optical axis in a direction of getting close to or separated from the optical axis;

a pair of swing diaphragm blades so provided at a portion to which the diaphragm aperture is opposed as to swing about a center axis in parallel to the optical axis in a direction of getting close to or separated from the optical axis; and a drive mechanism for adjusting the size of the diaphragm aperture by sliding the pair of straight moving diaphragm blades and by allowing the pair of swing diaphragm blades to swing, wherein there is provided a plurality of the pairs of swing diaphragm blades, one of the swing diaphragm blades of each pair of swing diaphragm blades of the plurality of pairs is provided on one face of the two faces to which the pair of straight moving diaphragm blades are opposed in the optical axis direction, and the other one of the swing diaphragm blades of each pair of swing diaphragm blades of the plurality of pairs is provided on the other face of the two faces to which the pair of straight moving diaphragm blades are opposed in the optical axis direction.

* * * * *